US012750845B2

(12) United States Patent
Qiao

(10) Patent No.: US 12,750,845 B2
(45) Date of Patent: Sep. 29, 2026

(54) METHOD AND APPARATUS FOR DETERMINING BLIND REPETITION SLOT RESOURCE, AND COMMUNICATION DEVICE

(71) Applicant: BEIJING XIAOMI MOBILE SOFTWARE CO., LTD., Beijing (CN)

(72) Inventor: Xuemei Qiao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 365 days.

(21) Appl. No.: 18/564,593

(22) PCT Filed: May 26, 2021

(86) PCT No.: PCT/CN2021/096162

§ 371 (c)(1),
(2) Date: Nov. 27, 2023

(87) PCT Pub. No.: WO2022/246711

PCT Pub. Date: Dec. 1, 2022

(65) Prior Publication Data

US 2024/0381345 A1 Nov. 14, 2024

(51) Int. Cl.
*H04W 4/00* (2018.01)
*H04L 1/08* (2006.01)
(Continued)

(52) U.S. Cl.
CPC ........... *H04W 72/1268* (2013.01); *H04L 1/08* (2013.01); *H04W 56/0015* (2013.01); *H04W 72/0446* (2013.01)

(58) Field of Classification Search
CPC .......... H04W 72/0446; H04W 72/1268; H04L 1/1887; H04L 5/0053
See application file for complete search history.

(56) References Cited

U.S. PATENT DOCUMENTS

2014/0362832 A1* 12/2014 Rudolf .................. H04L 1/1864 370/336
2019/0013903 A1* 1/2019 Zhang ................... H04L 1/1854
(Continued)

FOREIGN PATENT DOCUMENTS

CN 110351877 A 10/2019
CN 110475374 A 11/2019
(Continued)

OTHER PUBLICATIONS

International Search Report of PCT/CN2021/096162 dated Dec. 9, 2021 with English translation, (4p).
Moderator (Sharp), "FL Summary on Enhancements on PUSCH repetition type A", 3GPP TSG-RAN WG1 #105-e R1-2105992 e-Meeting, May 10-27, 2021, (36p).
(Continued)

*Primary Examiner* — Shantell L Heiber
(74) *Attorney, Agent, or Firm* — Arch & Lake LLP; Hao Tan; Shen Wang

(57) ABSTRACT

The present disclosure relates to a method and apparatus for determining a slot resource for blind retransmission. The method includes: determining uplink grant information for the blind retransmission, the uplink grant information for the blind retransmission being used to schedule retransmission of uplink information; obtaining slot formats corresponding respectively to a plurality of slot resources, the slot formats including at least one of an uplink slot, a downlink slot and a flexible/special slot; selecting at least one available slot resource from the uplink slot and the flexible/special slot among the plurality of slot resources according to the uplink grant information for the blind retransmission and the slot formats; and determining an actual available slot resource from the at least one available slot resource to perform the blind retransmission of the uplink information.

15 Claims, 10 Drawing Sheets

(51) Int. Cl.
*H04W 56/00* (2009.01)
*H04W 72/0446* (2023.01)
*H04W 72/1268* (2023.01)

(56) References Cited

U.S. PATENT DOCUMENTS

| | | | | |
|---|---|---|---|---|
| 2020/0214006 | A1 | 7/2020 | Choi et al. | |
| 2020/0344835 | A1 | 10/2020 | Wang et al. | |
| 2021/0105104 | A1* | 4/2021 | Cao | H04L 1/1893 |
| 2021/0144750 | A1* | 5/2021 | Cao | H04W 72/0453 |
| 2022/0256611 | A1* | 8/2022 | Priyanto | H04W 72/12 |
| 2023/0247630 | A1* | 8/2023 | Yao | H04L 1/0038 370/329 |

FOREIGN PATENT DOCUMENTS

| | | | |
|---|---|---|---|
| CN | 111278056 | A | 6/2020 |
| CN | 111756496 | A | 10/2020 |
| CN | 111988848 | A | 11/2020 |

OTHER PUBLICATIONS

ZTE Corporation, Discussion on support of Type A PUSCH repetitions for Msg3 8.8.3, 3GPP TSG RAN WG1 #105-e e-Meeting, May 10-27, 2021, R1-2104334, (16p).

Huang Chencheng,“Review on Physical Layer Key Technology of 3GPP 5G NR”,Guangdong Planning and Designing Institute of Telecommunications,File No. 1006-1010(2018)10-0001-08,dated on 2018.(9P).

Xu na, et al.“Shipping Date based on Beidou Satellite Navigation and AIS System”,DOI:10.14004/j.cnki.ckt.2014.0949, vol. 10, No. 32,Nov. 2014.(5P).

Moderator,“Feature lead summary #1 on support of Type A PUSCH repetitions for Msg3”,R1-2106007,3GPP TSG RAN WG1 #105-e,e-Meeting, May 10-27, 2021,Agenda item: 8.8.3,Document for: Discussion and Decision.(22P).

Qualcomm Incorporated,“Type-A PUSCH repetition for Msg3”,R1-2104689,3GPP TSG RAN WG1 #105e,e-Meeting, May 10-27, 2021,Agenda item: 8.8.3,Document for: Discussion/Decision.(6P).

Chinese Patent Office,Office Action issue in Application No. 202180001551.8 dated on Dec. 15, 2023.(4P).

* cited by examiner

METHOD AND APPARATUS FOR DETERMINING BLIND REPETITION SLOT RESOURCE, AND COMMUNICATION DEVICE

CROSS-REFERENCE TO RELATED APPLICATIONS

This application is a national stage entry of International Application No. PCT/CN2021/096162, filed May 26, 2021, the entire disclosure of which is incorporated herein by reference for all purposes.

TECHNICAL FIELD

The present disclosure relates to the field of wireless communication technologies, and in particular, to a method and apparatus for determining a slot resource for a blind repetition, and a communication device.

BACKGROUND

In order to achieve reliability of uplink information transmission, coverage enhancement of uplink information can be made. A network side device allocates a plurality of consecutive slots to User Equipment (UE), and the UE transmits a different redundancy version of the same Transport Block (TB) on each slot resource. In a Time Division Duplex (TDD) band, there may be a slot resource in the consecutive slot resources that cannot be used to transmit uplink information. Therefore, how the UE determines a slot resource used for uplink information repetition is very important.

SUMMARY

According to an embodiment in a first aspect of the present disclosure, there is provided a method for determining a slot resource for a blind repetition. The method is performed by UE and the method includes: determining uplink grant information for the blind repetition, where the uplink grant information for the blind repetition is used to schedule repetition of uplink information; obtaining slot formats corresponding to a plurality of slot resources respectively, where the slot formats include at least one of an uplink slot, a downlink slot and a flexible/special slot; selecting at least one available slot resource from the uplink slot and the flexible/special slot among the plurality of slot resources according to the uplink grant information for the blind repetition and the slot formats; and determining an actual available slot resource from the at least one available slot resource to perform the blind repetition of the uplink information.

Optionally, selecting at least one available slot resource from the uplink slot and the flexible/special slot among the plurality of slot resources according to the uplink grant information for the blind repetition and the slot formats includes: obtaining the number K of blind repetitions and a slot offset value k2 corresponding to the uplink grant information for the blind repetition; and based on the number K of blind repetitions and the slot offset value k2, determining, among slots after a slot $n+k2-1$, K slot resources of slot resources with slot formats which are the uplink slot and the flexible/special slot as the available slot resource, where n is a slot in which the uplink grant information for the blind repetition is received.

Optionally, the slot formats are configured by cell common signaling.

Optionally, in response to that, on a flexible slot resource, a symbol resource determined according to the uplink grant information for the blind repetition includes a downlink symbol, the flexible slot resource is not determined as the available slot resource; in response to that, on the flexible slot resource, the symbol resource determined according to the uplink grant information for the blind repetition does not include the downlink symbol, the flexible slot resource is determined as the available slot resource.

Optionally, in response to that a symbol on a flexible slot resource is allocated for transmitting a Synchronization Signal Block (SSB) and the symbol is located within a symbol resource allocated for the uplink information, the flexible slot resource is not determined as the available slot resource; otherwise, the flexible slot resource is determined as the available slot resource.

Optionally, determining the actual available slot resource from the at least one available slot resource to perform the blind repetition of the uplink information includes: in response to that dynamic indication information or user-specific configuration signaling configures a flexible slot in the at least one available slot as a downlink slot, determining the flexible slot as an actual unavailable slot resource; otherwise, determining the flexible slot as the actual available slot resource.

Optionally, the method further includes: receiving indication information sent from a network side device, where the indication information is used to indicate a maximum common set for a plurality of UEs in a cell where the UE resides in or a maximum common set for a plurality of UEs in a same beam direction, where the maximum common set includes a plurality of slot resources corresponding to the uplink slot and the flexible/special slot.

Optionally, selecting at least one available slot resource from the uplink slot and the flexible/special slot among the plurality of slot resources according to the uplink grant information for the blind repetition and the slot formats includes: determining a slot resource in the maximum common set as the at least one available slot resource.

Optionally, determining the actual available slot resource from the at least one available slot resource to perform the blind repetition of the uplink information includes: determining the number of slot resources required for repetition; determining a repetition starting slot resource for the uplink information; and according to the repetition starting slot resource, performing selection of the actual available slot resource from the maximum common set, until the number of slot resources required for repetition is reached.

Optionally, the method further includes: performing repetition(s) of the uplink information on the actual available slot resource.

Optionally, the uplink information is a message 3 (Msg3).

According to an embodiment in a second aspect of the present disclosure, there is provided another method for determining a slot resource for a blind repetition. The method is performed by a network side device and includes: determining slot formats corresponding to a plurality of slot resources respectively, where the slot formats include an uplink slot, a downlink slot and a flexible/special slot; and determining a plurality of slot resources with slot formats which are the uplink slot and the flexible/special slot as at least one available slot resource, and determining the at least one available slot resource as the slot resource for the repetition.

Optionally, the method further includes: monitoring uplink information which is blindly retransmitted by UE in the slot resource for the repetition.

Optionally, the method further includes: sending uplink grant information for a blind repetition to a UE, where the uplink grant information for the blind repetition is used to schedule repetition(s) of uplink information.

Optionally, the method further includes: sending indication information to a UE, where the indication information is used to indicate a maximum common set for at least one UE in a cell where the UE resides in or a maximum common set for at least one UE in a same beam direction.

Optionally, uplink information is a message 3 (Msg3).

According to an embodiment in a third aspect of the present disclosure, there is provided another method for determining a slot resource for a blind repetition. The method is performed by a network side device and the method includes: determining downlink grant information for the blind repetition, where the downlink grant information for the blind repetition is used to schedule repetition of downlink information; determining slot formats corresponding to a plurality of slot resources respectively, where the slot formats include an uplink slot, a downlink slot and a flexible/special slot; selecting at least one available slot resource from the downlink slot and the flexible/special slot among the plurality of slot resources according to the downlink grant information for the blind repetition and the slot formats; and determining an actual available slot resource from the at least one available slot resource; and performing the blind repetition of the downlink information to a UE using the actual available slot resource.

Optionally, in response to that, on a flexible slot resource, a symbol resource determined according to the downlink grant information for the blind repetition includes an uplink symbol, the flexible slot resource is not determined as the available slot resource; in response to that, on the flexible slot resource, the symbol resource determined according to the downlink grant information for the blind repetition does not include the uplink symbol, the flexible slot resource is determined as the available slot resource.

Optionally, in response to that a symbol on a flexible slot resource is allocated for transmitting a Synchronization Signal Block (SSB) and the symbol is located within a symbol resource allocated for the downlink information, the flexible slot resource is not determined as the available slot resource; otherwise, the flexible slot resource is determined as the available slot resource.

Optionally, determining the actual available slot resource from the at least one available slot resource includes: in response to that dynamic indication information or user-specific configuration signaling configures a flexible slot in the at least one available slot as an uplink slot, determining the flexible slot as an actual unavailable slot resource; otherwise, determining the flexible slot as the actual available slot resource.

Optionally, the method further includes: determining a maximum common set for a plurality of UEs in a cell where the UE resides in or a maximum common set for a plurality of UEs in a same beam direction, where the maximum common set includes a plurality of slot resources corresponding to the downlink slot and the flexible/special slot.

Optionally, selecting at least one available slot resource from the downlink slot and the flexible/special slot among the plurality of slot resources according to the downlink grant information for the blind repetition and the slot formats includes: determining a slot resource in the maximum common set as the at least one available slot resource.

Optionally, the downlink information includes at least one of a message 2 (Msg2), a message 4 (Msg4) and a paging message.

According to an embodiment in a fourth aspect of the present disclosure, there is provided another method for determining a slot resource for a blind repetition. The method is performed by a UE and the method includes: obtaining slot formats corresponding to a plurality of slot resources respectively, where the slot formats include an uplink slot, a downlink slot and a flexible/special slot; determining a plurality of slot resources with slot formats which are the downlink slot and the flexible/special slot as at least one available slot resource; and monitoring downlink information which is blindly retransmitted by a network side device in the at least one available slot resource.

Optionally, the slot formats are configured by cell common signaling.

According to an embodiment in a fifth aspect of the present disclosure, there is provided an apparatus for determining a slot resource for a blind repetition, including: a processing module configured to determine uplink grant information for the blind repetition, where the uplink grant information for the blind repetition is used to schedule repetition of uplink information; where the processing module is further configured to obtain slot formats corresponding to a plurality of slot resources respectively, where the slot formats include at least one of an uplink slot, a downlink slot and a flexible/special slot; where the processing module is further configured to select at least one available slot resource from the uplink slot and the flexible/special slot among the plurality of slot resources according to the uplink grant information for the blind repetition and the slot formats; where the processing module is further configured to determine an actual available slot resource from the at least one available slot resource; and a transceiving module configured to perform the blind repetition of the uplink information using the actual available slot resource.

According to an embodiment in a sixth aspect of the present disclosure, there is provided another apparatus determining a slot resource for a blind repetition, including: a processing module configured to determine slot formats corresponding to a plurality of slot resources respectively, where the slot formats include an uplink slot, a downlink slot and a flexible/special slot; where the processing module is further configured to determine a plurality of slot resources with slot formats which are the uplink slot and the flexible/special slot as at least one available slot resource, and determine the at least one available slot resource as the slot resource for the repetition.

According to an embodiment in a seventh aspect of the present disclosure, there is provided another apparatus for determining a slot resource for a blind repetition, including: a processing module configured to determine downlink grant information for the blind repetition, where the downlink grant information for the blind repetition is used to schedule a repetition of downlink information, and the processing module is configured to determine slot formats corresponding to a plurality of slot resources respectively, where the slot formats include an uplink slot, a downlink slot and a flexible/special slot; where the processing module is further configured to select at least one available slot resource from the downlink slot and the flexible/special slot among the plurality of slot resources according to the downlink grant information for the blind repetition and the slot formats; where the processing module is configured to determine an actual available slot resource from the at least one available slot resource; and a transceiving module configured to perform the blind repetition of the downlink information to User Equipment (UE) using the actual available slot resource.

According to an embodiment in an eighth aspect of the present disclosure, there is provided another apparatus for determining a slot resource for a blind repetition, including: a processing module configured to obtain slot formats corresponding to a plurality of slot resources respectively, where the slot formats include an uplink slot, a downlink slot and a flexible/special slot; where the processing module is further configured to determine a plurality of slot resources with slot formats which are the downlink slot and the flexible/special slot as at least one available slot resource; and monitor downlink information which is blindly retransmitted by a network side device in the at least one available slot resource.

According to an embodiment in a ninth aspect of the present disclosure, there is provided a communication device including: a transceiver; a memory; and a processor respectively connected to the transceiver and the memory and configured to control transmission and reception of a radio signal by the transceiver by executing computer-executable instructions on the memory, and capable of implementing the method for determining a slot resource for a blind repetition provided in the embodiments of the first aspect, or implementing the method for determining a slot resource for a blind repetition provided in the embodiments of the fourth aspect.

According to an embodiment in a tenth aspect of the present disclosure, there is provided another communication device including: a transceiver; a memory; and a processor respectively connected to the transceiver and the memory and configured to control transmission and reception of a radio signal by the transceiver by executing computer-executable instructions on the memory, and capable of implementing the method for determining a slot resource for a blind repetition provided in the embodiments of the second aspect, or implementing the method for determining a slot resource for a blind repetition provided in the embodiments of the third aspect.

According to an embodiment in an eleventh aspect of the present disclosure, there is provided a communication device including: a processor and an interface circuit; where the interface circuit is configured to receive code instructions and transmit them to the processor; where processor is configured to run the code instructions to perform the method for determining a slot resource for a blind repetition provided in the embodiments of the first aspect, or perform the method for determining a slot resource for a blind repetition provided in the embodiments of the fourth aspect.

According to an embodiment in a twelfth aspect of the present disclosure, there is provided another communication device including: a processor and an interface circuit; where the interface circuit is configured to receive code instructions and transmit them to the processor; where processor is configured to run the code instructions to perform the method for determining a slot resource for a blind repetition provided in the embodiments of the second aspect, or perform the method for determining a slot resource for a blind repetition provided in the embodiments of the third aspect.

According to an embodiment in a thirteenth aspect of the present disclosure, there is provided a computer storage medium, where the computer storage medium stores computer-executable instructions, when the computer-executable instructions are executed by a processor, the method for determining a slot resource for a blind repetition provided in the embodiments of the first aspect, or the method for determining a slot resource for a blind repetition provided in the embodiments of the fourth aspect can be implemented.

According to an embodiment in a fourteenth aspect of the present disclosure, there is provided a computer storage medium, where the computer storage medium stores computer-executable instructions, when the computer-executable instructions are executed by a processor, the method for determining a slot resource for a blind repetition provided in the embodiments of the second aspect, or the method for determining a slot resource for a blind repetition provided in the embodiments of the third aspect can be implemented.

According to an embodiment in a fifteenth aspect of the present disclosure, there is provided a computer program product, including a computer program. When the computer program is executed by a processor, the method for determining a slot resource for a blind repetition provided in the embodiments of the first aspect, or the method for determining a slot resource for a blind repetition provided in the embodiments of the fourth aspect can be implemented.

According to an embodiment in a sixteenth aspect of the present disclosure, there is provided a computer program product, including a computer program. When the computer program is executed by a processor, the method for determining a slot resource for a blind repetition provided in the embodiments of the second aspect, or the method for determining a slot resource for a blind repetition provided in the embodiments of the third aspect can be implemented.

In the methods and apparatuses for determining a slot resource for a blind repetition and communication devices provided in embodiments of the present disclosure, a UE determines uplink grant information for the blind repetition, the uplink grant information for the blind repetition is used to schedule repetition(s) of uplink information, and the UE obtains slot formats corresponding to a plurality of slot resources respectively, and the slot formats include at least one of an uplink slot, a downlink slot and a flexible/special slot. The UE selects at least one available slot resource from the uplink slot and the flexible/special slot among the plurality of slot resources according to the uplink grant information for the blind repetition and the slot formats, and determines an actual available slot resource from the at least one available slot resource to perform the blind repetition of the uplink information. In this way, the UE can determine a slot resource for transmission repetition of the uplink information from the plurality of slot resources, so as to ensure the reliability of the uplink information transmission, and enhance the coverage capability of uplink information transmission.

Additional aspects and advantages of the present disclosure will be set forth in part in the description which follows, and in part will be obvious from the description, or may be learned by practice of the disclosure.

BRIEF DESCRIPTION OF THE DRAWINGS

The above and/or additional aspects and advantages of the present disclosure will become apparent and readily understood from the following description of the embodiments in conjunction with the accompanying drawings, in which.

DETAILED DESCRIPTION

Figure 1:
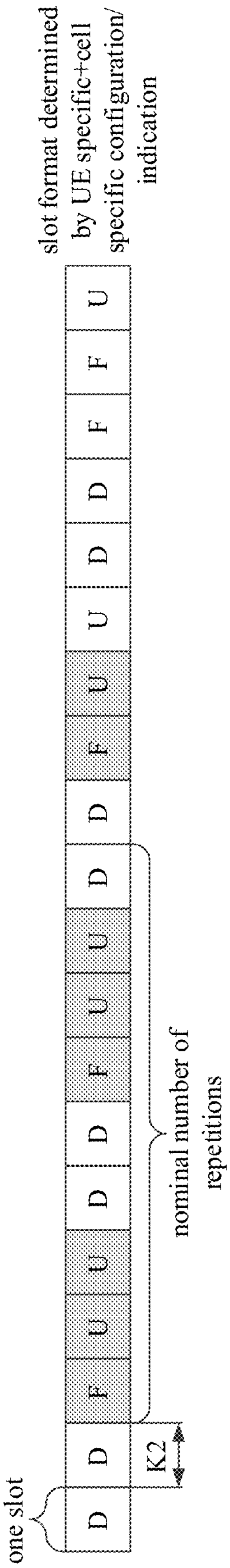
FIG. 1 is a schematic diagram of the number of transmission repetitions.

Example embodiments will be described in detail herein, examples of which are illustrated in the accompanying drawings. When the following description refers to the drawings, the same numbers in different drawings refer to the same or similar elements unless otherwise indicated. The implementations described in the following example embodiments do not represent all implementations consistent with embodiments of the present disclosure. Rather, they are merely examples of apparatuses and methods consistent with aspects of embodiments of the present disclosure as set forth in the appended claims.

The terminologies used in the embodiments of the present disclosure are for the purpose of describing specific embodiments only and are not intended to limit the embodiments of the present disclosure. As used in the embodiments of the present disclosure and the appended claims, the singular forms “a”, “an” and “the” are intended to include a plural form as well, unless the context clearly dictates otherwise. It will also be understood that the term “and/or” as used herein refers to and includes any and all possible combinations of one or more of associated listed items.

It should be understood that although terms “first”, “second”, “third”, etc. may be used to describe various information in the embodiments of the present disclosure, the information should not be limited to these terms. These terms are only used to distinguish information of the same type from each other. For example, without departing from the scope of the embodiments of the present disclosure, first information may also be called second information, and similarly second information may also be called first information. Depending on the context, the words like “if” and “in a case where” as used herein may be interpreted as “when” or “on condition that” or “in response to determining . . . ”.

Embodiments of the present disclosure will be described in detail below, examples of which are illustrated in the accompanying drawings. The same or similar reference numerals refer to the same or similar elements throughout the drawings. The embodiments described below with reference to the accompanying drawings are illustrative and intended to explain the present disclosure and are not to be construed as limitations of the present disclosure.

For number of Physical Downlink Shared Channel (PUSCH) type A transmission repetitions counting in Rel-16, assuming that the number of transmission repetitions given by Time Domain Resource Allocation (TDRA) is 8, as shown in FIG. 1, the number of blind repetitions scheduled by a network side device is 8, and the actual number of blind repetitions of User Equipment (UE) is only 5.

In FIG. 1, D (Downlink) slot refers to a slot used for downlink transmission, F (Flexible) slot refers to a slot used for downlink transmission or uplink transmission, U (Uplink) slot refers to a slot used for uplink transmission, and k2 refers to a timing relationship between data scheduling and data transmission in the uplink direction, that is, timing from when the UE receives an uplink grant (UL grant) to when the UE starts to send data on a scheduled uplink PUSCH.

In Release 16, when a UE performs PUSCH type A transmission repetition, a network side device allocates K consecutive slots to the UE, and the UE transmits a different redundancy version of the same Transport Block (TB) on each slot resource to achieve transmission reliability. In a Time Division Duplex (TDD) band, since a downlink symbol or a downlink slot may appear in the consecutive slot resources, in this case, the UE may actually cancel this transmission repetition, that is to say, the actual number of blind repetitions by the UE may be less than the number of blind transmissions dynamically indicated by the network side device. The number of blind transmissions may be indicated by a TDRA field in Downlink Control Information (DCI) signaling.

In Release 15/16, a message 3 (i.e., Msg3) cannot be blindly retransmitted, but in Release 17, in order to realize coverage enhancement of Msg3, PUSCH type A repetition is proposed for Msg3 transmission repetition. At the same time, in order to obtain more available slot resources to transmit redundancy versions of Msg3 for more times, Rel-17 proposes to use an available slot resource for counting and conduct corresponding researches.

A resource that cannot be used for Msg3 transmission is called an unavailable resource for Msg3 transmission, which mainly includes the following kinds of resources:

first, a symbol which is indicated as downlink by Time Division Duplex-Uplink-Downlink-Common configuration (TDD-UL-DL-ConfigurationCommon) signaling, Time Division Duplex-Uplink-Downlink-Dedicated configuration (TDD-UL-DL-ConfigurationDedicated) signaling or Slot Format Indicator (SFI) information;

second, a symbol which is not indicated as a flexible symbol by Time Division Duplex-Uplink-Downlink-Common configuration (TDD-UL-DL-Configuration-Common) signaling or Time Division Duplex-Uplink-Downlink-Dedicated configuration (TDD-UL-DL-ConfigurationDedicated) signaling and is used for Synchronization Signal Block (SSB) transmission.

The TDD-UL-DL-ConfigurationCommon signaling may be understood as configuration of cell specific signaling, and the TDD-UL-DL-ConfigurationDedicated signaling or SFI information may be understood as configuration of UE specific signaling.

Currently, in a TDD band, for a Radio Resource Control (RRC) connected state, the easiest way to think about for determining an available slot resource for Msg3 transmission repetition is that: a UE excludes a downlink slot (DL slot or D slot) through a slot format configured by UE specific signaling+cell specific signaling, and determines an uplink slot (UL slot or U slot) and a flexible slot (F slot) as available slot resource(s) for Msg3 transmission repetition.

However, for contention-based random access, even in the RRC connected state, the network side device still cannot know which UE it schedules when performing Msg3 scheduling, and thus the network side device cannot know a slot format determined by UE specific signaling for the UE. Therefore, the network side device can only determine the available slot resource(s) for Msg3 transmission repetition through a slot format determined by cell specific signaling.

Figure 2:
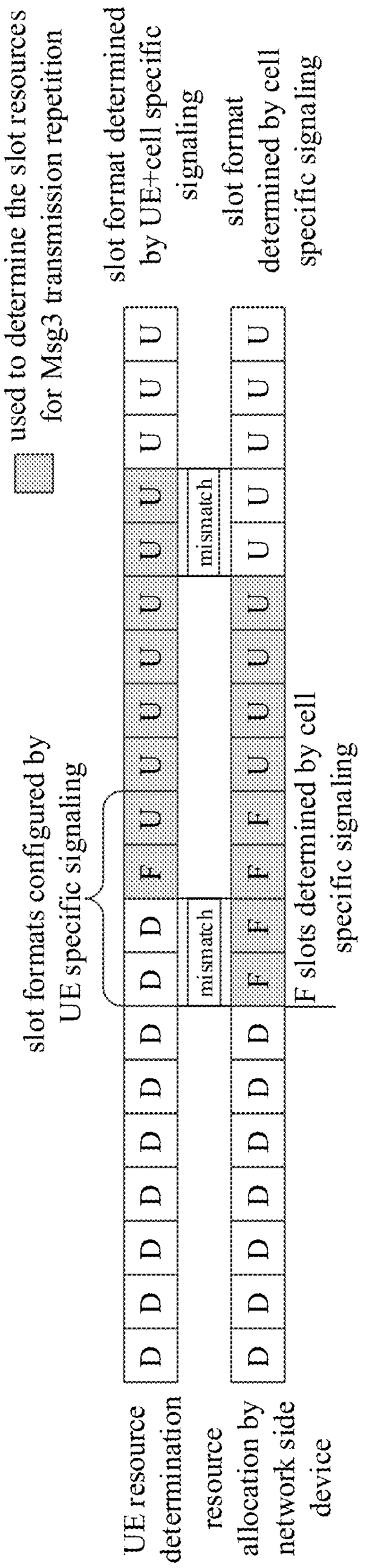
FIG. 2 is a schematic diagram of a procedure for determining the number of transmission repetitions.

Assuming that the number of transmission repetitions indicated by the network side device is 8, as shown in FIG. 2, the network side device determines the available slot resource(s) for Msg3 transmission repetition through a slot format determined by cell specific signaling, which may result in that the slot resource(s) determined by the UE and the network side device are not aligned, and thus a situation of scheduling disorder may occur.

In view of the above problem, the present disclosure provides methods and apparatuses for determining a slot resource for a blind repetition and communication devices.

Figure 3:
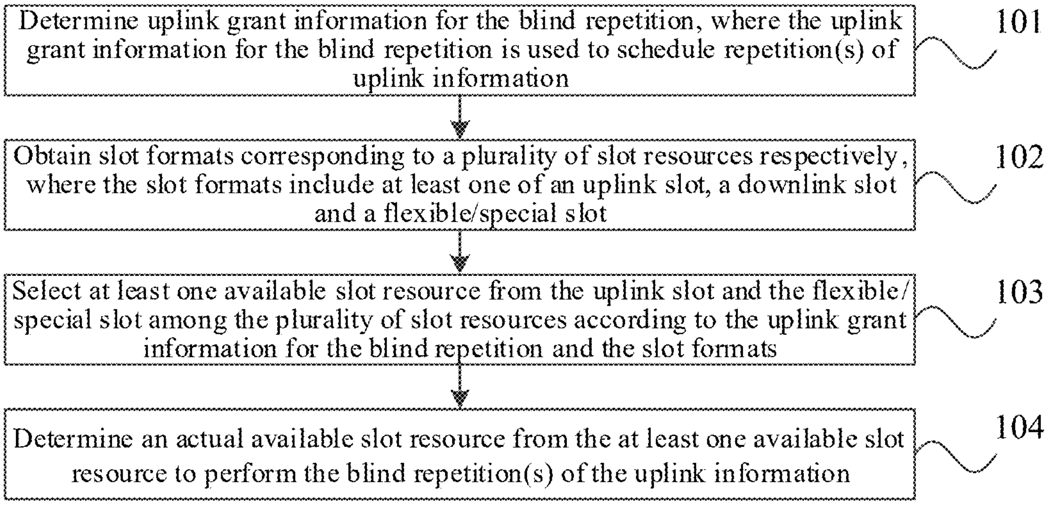
FIG. 3 is a schematic flowchart of a method for determining a slot resource for a blind repetition provided by an embodiment of the present disclosure.

FIG. 3 is a schematic flowchart of a method for determining a slot resource for a blind repetition provided by an embodiment of the present disclosure. The method for determining a slot resource for a blind repetition may be performed by a UE.

The UE may refer to a device that provides voice and/or data connectivity to a user, a handheld device with a wireless connection function, or other processing device connected to a wireless modem, etc. In different systems, the name of UE may be different. A wireless UE may communicate with one or more Core Networks (CNs) via an RAN. The wireless UE may be a mobile terminal device, such as a mobile phone (or "cellular" phone) and a computer with a mobile terminal device, for example, which may be portable, pocket-sized, handheld, computer-built-in, or vehicle-mounted mobile devices that exchange voice and/or data with a radio access network.

For example, the UE may be a Personal Communication Service (PCS) phone, a cordless phone, a Session Initiated Protocol (SIP) phone, a Wireless Local Loop (WLL) station, a Personal Digital Assistant (PDA) or other devices. The wireless UE may also be called a system, a subscriber unit, a subscriber station, a mobile station, a mobile, a remote station, an access point, a remote terminal, an access terminal, a user terminal, a user agent, or a user device, which is not limited in the embodiments of the present disclosure.

As shown in FIG. 3, the method for determining a slot resource for a blind repetition may include the following steps:

In step 101, uplink grant information for the blind repetition is determined. The uplink grant information for the blind repetition is used to schedule repetition(s) of uplink information.

In an embodiment of the present disclosure, the uplink grant information for the blind repetition may be sent to the UE by a network side device, and the uplink grant information for the blind repetition may be used to schedule repetition(s) of uplink information.

Taking the network side device being a base station as an example, the base station may include a plurality of cells that provide services to UEs. Depending on specific application scenarios, each cell may contain multiple Transmission Reception Points or Transmit Receive Point (TRPs), or may be a device in an access network that communicates with a wireless terminal device through one or more sectors on an air interface, or other names. For example, the base station involved in the embodiment of the present disclosure may be a Base Transceiver Station (BTS) in Global System for Mobile communications (GSM) or Code Division Multiple Access (CDMA), or it may be a base station (NodeB) in Wide-band Code Division Multiple Access (WCDMA), or it may be an evolutional Node B (referred to as eNB or e-NodeB) in long term evolution (LTE) system, or a 5G base station (referred to as gNB) in a 5G network architecture (next generation system), or it may be Home evolved Node B (HeNB), relay node, home base station (femto), pico base station (pico), and so on, which are not limited in the embodiments of the present disclosure.

In step 102, slot formats corresponding to a plurality of slot resources respectively are obtained. The slot formats include at least one of an uplink slot, a downlink slot, and a flexible/special slot.

In an embodiment of the present disclosure, a slot format may include at least one of: an uplink slot (or called as UL slot, U slot), a downlink slot (or called as DL slot, D slot), a flexible slot (or called as F slot)/special slot (or called as S slot).

In an embodiment of the present disclosure, the UE may obtain slot formats which correspond to a plurality of slot resources, respectively.

It should be noted that the present disclosure does not limit the sequence of steps 101 and 102, and the above description only takes step 101 being performed before step 102 as an example. In actual applications, step 101 may be performed after step 102, or step 101 may be performed in parallel with step 102.

In step 103, at least one available slot resource is selected from the uplink slot(s) and the flexible/special slot(s) among the plurality of slot resources according to the uplink grant information for the blind repetition and the slot formats.

It can be understood that a downlink slot cannot be used to transmit uplink information. Therefore, in the embodiments of the present disclosure, according to the uplink grant information for the blind repetition and the slot formats, the UE may select at least one slot from the uplink slot(s) and the flexible/special slot(s) among the plurality of slot resources as at least one available slot resource.

In step 104, an actual available slot resource is determined from the at least one available slot resource to perform the blind repetition of the uplink information.

In the embodiments of the present disclosure, the UE may determine the actual available slot resource from at least one available slot resource, so that the UE may perform blind repetition(s) of the uplink information based on the actual available slot resource. That is, the UE may perform repetition(s) of the uplink information in the actual available slot resource.

In the method for determining a slot resource for a blind repetition provided in embodiments of the present disclosure, the UE determines the uplink grant information for the blind repetition, the uplink grant information for the blind repetition is used to schedule repetition(s) of uplink information, and the UE obtains slot formats corresponding to a plurality of slot resources respectively, and the slot formats include at least one of an uplink slot, a downlink slot and a flexible/special slot. The UE selects at least one available slot resource from the uplink slot and the flexible/special slot among the plurality of slot resources according to the uplink grant information for the blind repetition and the slot formats, and determines an actual available slot resource from the at least one available slot resource to perform the blind repetition of the uplink information. In this way, the UE can determine a slot resource for transmission repetition of the uplink information from the plurality of slot resources, so as to ensure the reliability of the uplink information transmission, and enhance the coverage capability of uplink information transmission.

It should be noted that the above possible implementations can be performed individually or in combination, and the embodiments of the present disclosure do not limit this.

Figure 4:
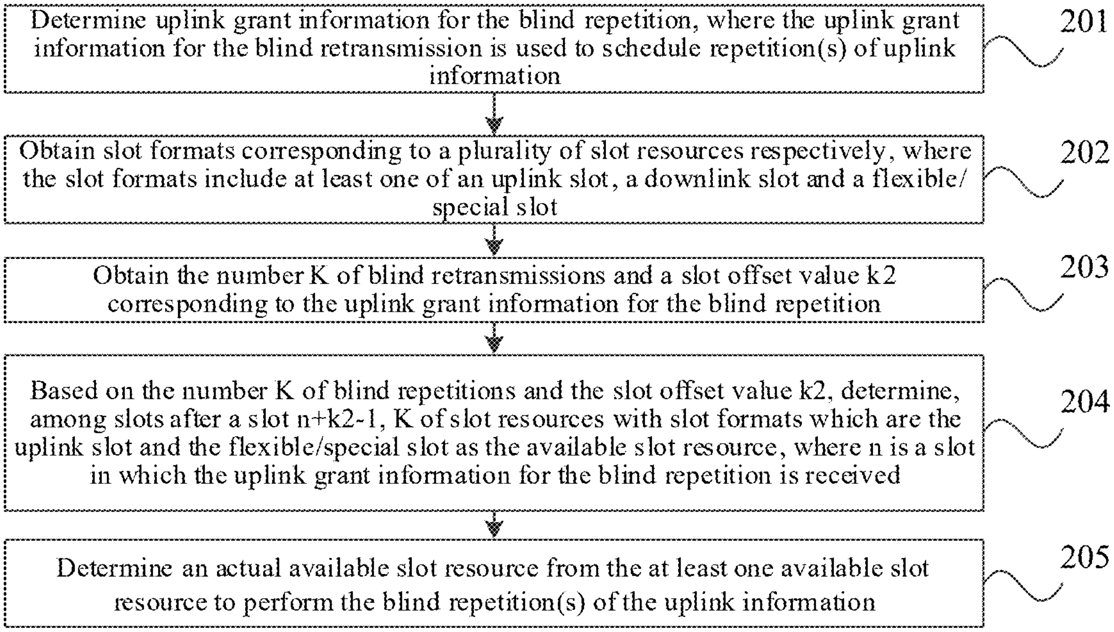
FIG. 4 is a schematic flowchart of another method for determining a slot resource for a blind repetition provided by an embodiment of the present disclosure.

An embodiment of the present disclosure provides another method for determining a slot resource for a blind repetition. FIG. 4 is a schematic flowchart of another method for determining a slot resource for a blind repetition provided by an embodiment of the present disclosure. The method for determining a slot resource for a blind repetition may be performed by a UE. The method for determining a slot resource for a blind repetition may be performed individually, or may be performed in combination with any embodiment or a possible implementation in an embodiment of the present disclosure, or may be performed in combination with any technical solution in related art.

As shown in FIG. 4, the method for determining a slot resource for a blind repetition may include the following steps:

In step 201, uplink grant information for the blind repetition is determined. The uplink grant information for the blind repetition is used to schedule repetition(s) of uplink information.

In step 202, slot formats corresponding to a plurality of slot resources respectively are obtained. The slot formats include at least one of: an uplink slot, a downlink slot, and a flexible/special slot.

In an embodiment of the present disclosure, steps 201 and 202 may be implemented in any manner in the embodiments of the present disclosure, which are not limited in embodiments of the present disclosure and will not be repeatedly described.

In step 203, the number K of blind repetitions and a slot offset value k2 corresponding to the uplink grant information for the blind repetition(s) are obtained.

In an embodiment of the present disclosure, the slot offset value k2 refers to a slot offset value from an uplink transmission starting position to an uplink grant position n, where the uplink grant position n refers to a slot position where the UE receives the uplink grant information for the blind repetition.

In an embodiment of the present disclosure, the number K of blind repetitions and the slot offset value k2 are indicated by the uplink grant information for the blind repetition. The UE may obtain the number K of blind repetitions and the slot offset value k2 corresponding to the uplink grant information for the blind repetition.

In step 204, based on the number K of blind repetitions and the slot offset value k2, among slots after a slot n+k2−1, K slot resources of slot resources with slot formats which are the uplink slot and the flexible/special slot are determined as the available slot resource, where n is a slot in which the uplink grant information for the blind repetition is received.

In an embodiment of the present disclosure, based on the number K of blind repetitions and the slot offset value k2, among slots after slot n+k2−1, the UE may determine K of slot resources with slot formats which are the uplink slot and the flexible slot or special slot are determined as the available slot resource.

In step 205, an actual available slot resource is determined from the at least one available slot resource to perform a blind repetition of the uplink information.

In embodiments of the present disclosure, step 205 may be implemented in any manner among various embodiments of the present disclosure, which are not limited in embodiments of the present disclosure and will not be repeatedly described.

In the method for determining a slot resource for blind repetition provided in embodiments of the present disclosure, the UE determines the uplink grant information for the blind repetition, the uplink grant information for the blind repetition is used to schedule repetition(s) of uplink information, and the UE obtains slot formats corresponding to a plurality of slot resources respectively, and the slot formats include at least one of an uplink slot, a downlink slot and a flexible/special slot. The UE selects at least one available slot resource from the uplink slot and the flexible/special slot among the plurality of slot resources according to the uplink grant information for the blind repetition and the slot formats, and determines an actual available slot resource from the at least one available slot resource to perform the blind repetition of the uplink information. In this way, the UE can determine a slot resource for transmission repetition of the uplink information from the plurality of slot resources, so as to ensure the reliability of the uplink information transmission, and enhance the coverage capability of uplink information transmission.

It should be noted that the above possible implementations can be performed individually or in combination, and the embodiments of the present disclosure do not limit this.

Figure 5:
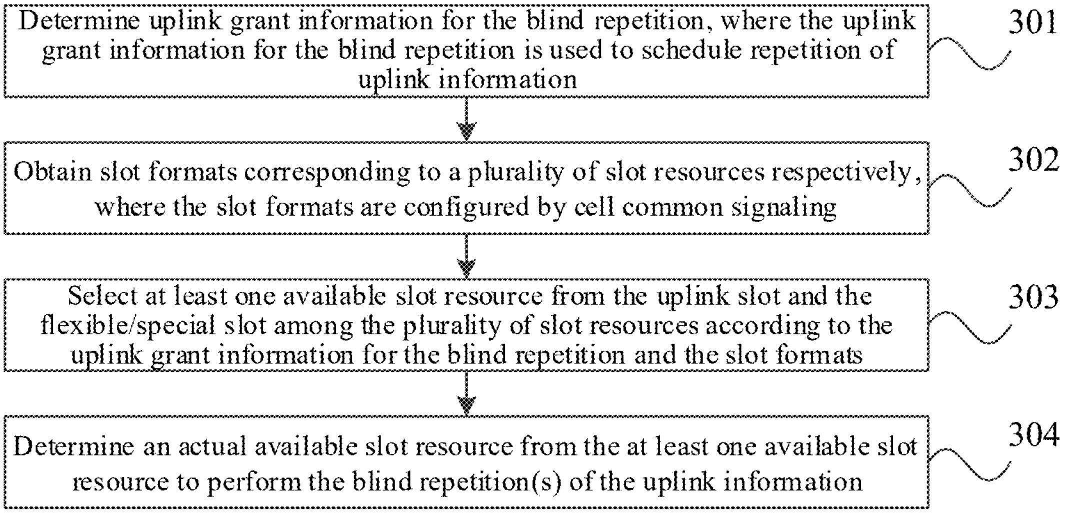
FIG. 5 is a schematic flowchart of another method for determining a slot resource for a blind repetition provided by an embodiment of the present disclosure.

An embodiment of the present disclosure provides another method for determining a slot resource for a blind repetition. FIG. 5 is a schematic flowchart of another method for determining a slot resource for a blind repetition provided by an embodiment of the present disclosure. The method for determining a slot resource for a blind repetition may be performed by a UE. The method for determining a slot resource for a blind repetition may be performed individually, or may be performed in combination with any embodiment or a possible implementation in an embodiment of the present disclosure, or may be performed in combination with any technical solution in related art.

As shown in FIG. 5, the method for determining a slot resource for a blind repetition may include the following steps:

In step 301, uplink grant information for the blind repetition is determined. The uplink grant information for the blind repetition is used to schedule repetition(s) of uplink information.

In this embodiment of the present disclosure, step 301 may be implemented in any manner in the embodiments of the present disclosure, which are not limited in embodiments of the present disclosure and will not be repeatedly described.

In step 302, slot formats corresponding to a plurality of slot resources respectively are obtained. The slot formats are configured by cell common signaling.

The slot formats include at least one of: an uplink slot, a downlink slot and a flexible/special slot.

In an embodiment of the present disclosure, the network side device may configure the slot formats which correspond to the slot resources respectively through cell common signaling. The cell common signaling is valid for multiple UEs in a cell. For example, the cell common signaling is valid for all UEs in the cell. Taking the cell common signaling being TDD-UL-DL-ConfigurationCommon signaling as an example, the network side device may configure the slot formats which correspond to slot resources respectively through TDD-UL-DL-ConfigurationCommon signaling. The TDD-UL-DL-ConfigurationCommon signaling is valid for all UEs in the cell where the UE resides in.

In an embodiment of the present disclosure, the UE may obtain the cell common signaling sent from the network side device, and obtain the slot formats which correspond to the plurality of slot resources respectively according to the cell common signaling.

In step 303, at least one available slot resource is selected from the uplink slot and the flexible/special slot among the plurality of slot resources according to the uplink grant information for the blind repetition and the slot formats.

In the embodiments of the present disclosure, step 303 may be implemented in any manner in the embodiments of the present disclosure, which is not limited in embodiments of the present disclosure and will not be repeatedly described.

In an embodiment of the present disclosure, if on a flexible slot resource, a symbol resource determined according to the uplink grant information for the blind repetition includes a downlink symbol, the flexible slot resource is not determined as the available slot resource.

In an embodiment of the present disclosure, if on a flexible slot resource, a symbol resource determined according to the uplink grant information for the blind repetition does not include a downlink symbol, the flexible slot resource is determined as the available slot resource.

In an embodiment of the present disclosure, if a symbol on a certain flexible slot resource is allocated for a SSB and the symbol is located within a symbol resource allocated for the uplink information, the flexible slot resource is not determined as the available slot resource.

In an embodiment of the present disclosure, if a symbol on a certain flexible slot resource is not allocated for a SSB and the symbol is located within a symbol resource allocated for the uplink information, the flexible slot resource is determined as the available slot resource. Alternatively, if a symbol on a certain flexible slot resource is not allocated for a SSB and the symbol is not located within the symbol resource allocated for the uplink information, the flexible slot resource is determined as the available slot resource. Alternatively, if a symbol on a certain flexible slot resource is allocated for a SSB, and the symbol is not located within the symbol resource allocated for the uplink information, the flexible slot resource is determined as the available slot resource.

In step 304, an actual available slot resource is determined from the at least one available slot resource to perform the blind repetition of the uplink information.

In the embodiment of the present disclosure, step 304 may be implemented in any manner in the embodiments of the present disclosure, which is not limited in embodiments of the present disclosure and will not be repeatedly described.

In the method for determining a slot resource for a blind repetition provided in embodiments of the present disclosure, the UE determines the uplink grant information for the blind repetition, the uplink grant information for the blind repetition is used to schedule repetition of uplink information, and the UE obtains slot formats corresponding to a plurality of slot resources respectively, and the slot formats include at least one of an uplink slot, a downlink slot and a flexible/special slot. The UE selects at least one available slot resource from the uplink slot and the flexible/special slot among the plurality of slot resources according to the uplink grant information for the blind repetition and the slot formats, and determines an actual available slot resource from the at least one available slot resource to perform the blind repetition of the uplink information. In this way, the UE can determine a slot resource for transmission repetition of the uplink information from the plurality of slot resources, so as to ensure the reliability of the uplink information transmission, and enhance the coverage capability of uplink information transmission.

It should be noted that the above possible implementations can be performed individually or in combination, and the embodiments of the present disclosure do not limit this.

Figure 6:
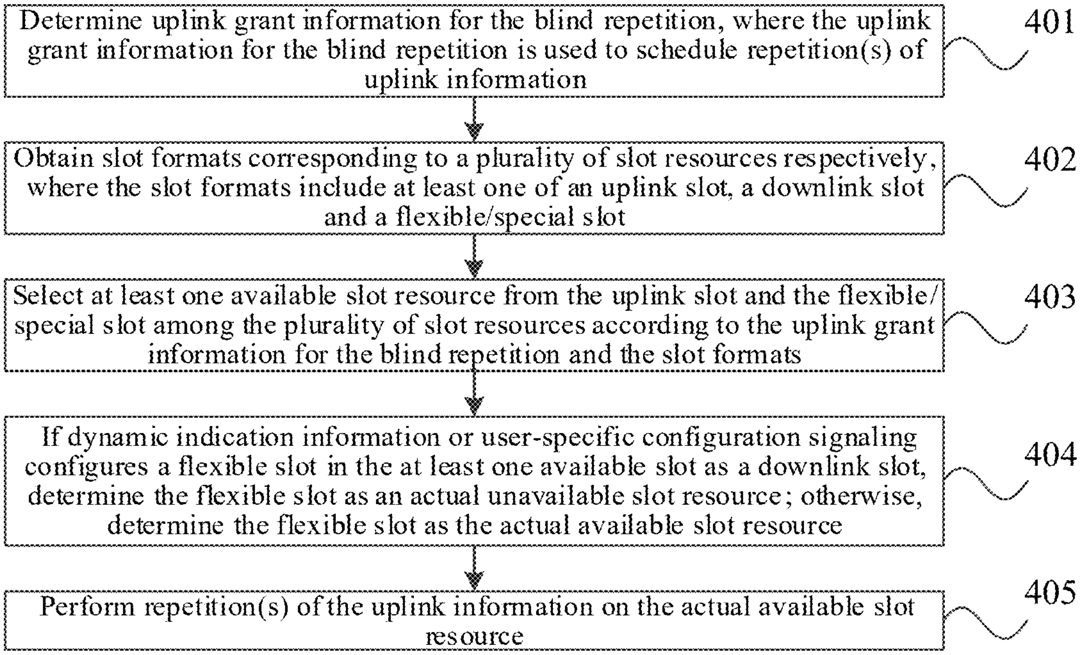
FIG. 6 is a schematic flowchart of another method for determining a slot resource for a blind repetition provided by an embodiment of the present disclosure.

An embodiment of the present disclosure provides another method for determining a slot resource for a blind repetition. FIG. 6 is a schematic flowchart of another method for determining a slot resource for a blind repetition provided by an embodiment of the present disclosure. The method for determining a slot resource for a blind repetition may be performed by a UE. The method for determining a slot resource for a blind repetition may be performed individually, or may be performed in combination with any embodiment or a possible implementation in an embodiment of the present disclosure, or may be performed in combination with any technical solution in related art.

As shown in FIG. 6, the method for determining a slot resource for a blind repetition may include the following steps:

In step 401, uplink grant information for the blind repetition is determined. The uplink grant information for the blind repetition is used to schedule repetition(s) of uplink information.

In any one of embodiments of the present disclosure, the uplink information may include Msg3.

In step 402, slot formats corresponding to a plurality of slot resources respectively are obtained. The slot formats include at least one of: an uplink slot, a downlink slot, and a flexible/special slot.

In step 403, at least one available slot resource is selected from the uplink slot and the flexible/special slot among the plurality of slot resources according to the uplink grant information for the blind repetition and the slot formats.

In the embodiment of the present disclosure, steps 401 to 403 may be implemented in any manner in the embodiments of the present disclosure, which are not limited in embodiments of the present disclosure and will not be repeatedly described.

In step 404, if dynamic indication information or user-specific configuration signaling configures a flexible slot in the at least one available slot as a downlink slot, the flexible slot is determined as an actual unavailable slot resource; otherwise, the flexible slot is determined as an actual available slot resource.

In the embodiment of the present disclosure, if dynamic indication information or user-specific configuration signaling configures a flexible slot in the at least one available slot as a downlink slot, the UE may determine the flexible slot as an actual unavailable slot resource; if the dynamic indication information or user-specific configuration signaling does not configure the flexible slot in the at least one available slots as a downlink slot, the UE can determine the flexible slot as an actual available slot resource.

Figure 7:
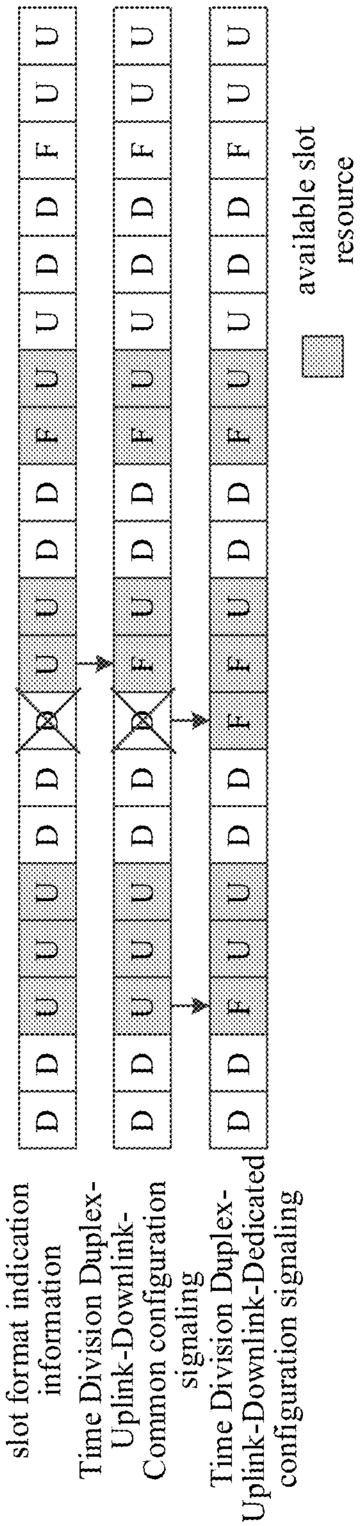
FIG. 7 is a schematic diagram of a procedure for determining a slot resource for a blind repetition according to an embodiment of the present disclosure.

Taking the dynamic indication information being SFI information and the user-specific configuration signaling being TDD-UL-DL-ConfigurationDedicated signaling as an example, as shown in FIG. 7, the network side device configures through TDD-UL-DL-ConfigurationCommon signaling the slot formats corresponding to the slot resources respectively. Assuming that the second F slot configured by TDD-UL-DL-ConfigurationCommon signaling is indicated as a downlink slot by TDD-UL-DL-ConfigurationDedicated signaling, the UE can determine the second F slot indicated by TDD-UL-DL-ConfigurationCommon signaling as an actual unavailable slot resource, so that the UE may not retransmit the uplink information on the actual unavailable slot resource.

In step 405, repetition(s) of the uplink information is performed on the actual available slot resource.

In the method for determining a slot resource for a blind repetition provided in embodiments of the present disclosure, the UE determines the uplink grant information for the blind repetition, the uplink grant information for the blind repetition is used to schedule repetition(s) of uplink information, and the UE obtains slot formats corresponding to a plurality of slot resources respectively, and the slot formats include at least one of an uplink slot, a downlink slot and a flexible/special slot. The UE selects at least one available slot resource from the uplink slot and the flexible/special slot among the plurality of slot resources according to the uplink grant information for the blind repetition and the slot formats, and determines an actual available slot resource from the at least one available slot resource to perform the blind repetition of the uplink information. In this way, the UE can determine a slot resource for transmission repetition of the uplink information from the plurality of slot resources, so as to ensure the reliability of the uplink information transmission, and enhance the coverage capability of uplink information transmission.

It should be noted that the above possible implementations can be performed individually or in combination, and the embodiments of the present disclosure do not limit this.

Figure 8:
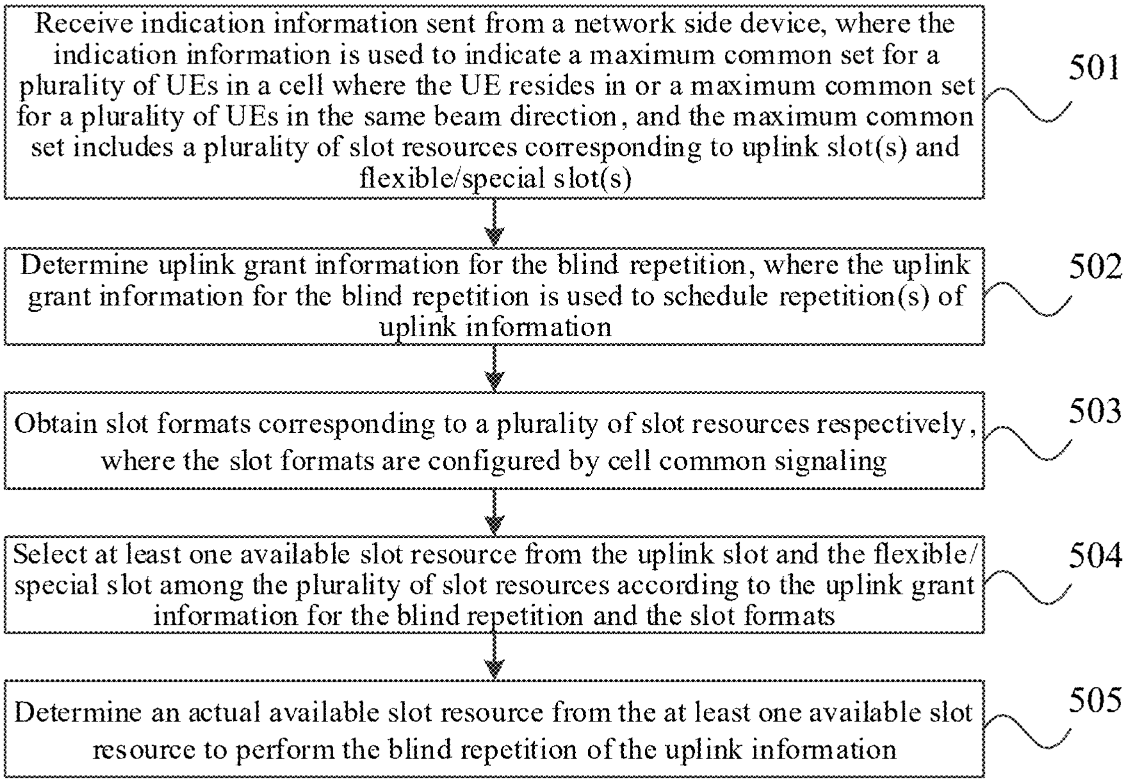
FIG. 8 is a schematic flowchart of another method for determining a slot resource for a blind repetition provided by an embodiment of the present disclosure.

An embodiment of the present disclosure provides another method for determining a slot resource for a blind repetition. FIG. 8 is a schematic flowchart of another method for determining a slot resource for a blind repetition provided by an embodiment of the present disclosure. The method for determining a slot resource for a blind repetition may be performed by a UE. The method for determining a slot resource for a blind repetition may be performed individually, or may be performed in combination with any embodiment or a possible implementation in an embodiment of the present disclosure, or may be performed in combination with any technical solution in related art.

As shown in FIG. 8, the method for determining a slot resource for a blind repetition may include the following steps:

In step 501, indication information sent from a network side device is received. The indication information is used to indicate a maximum common set for a plurality of UEs in a cell where the UE resides in or a maximum common set for a plurality of UEs in the same beam direction. The maximum common set includes a plurality of slot resources corresponding to uplink slot(s) and flexible/special slot(s).

In a possible implementation of the embodiment of the present disclosure, the network side device may indicate through the indication information the maximum common set for a plurality of UEs in the cell where the UE resides in. The maximum common set may include a plurality of slot resources corresponding to uplink slot(s) and flexible/special slot(s).

As an example, the network side device may indicate, through the indication information, the maximum common set of uplink slots and flexible slots/special slots for all UEs in the cell where the UE resides in.

In another possible implementation of the embodiment of the present disclosure, the network side device may indicate, through the indication information, the maximum common set for a plurality of UEs in the same beam direction in the cell where the UE resides in. The maximum common set may include a plurality of slot resources corresponding to uplink slot(s) and flexible/special slot(s).

As an example, the network side device may indicate, through the indication information, the maximum common set of uplink slots and flexible slots/special slots for all UEs in the same beam direction in the cell where the UE resides in.

In a RRC connected state, the network side device may know information of all terminals in a beam direction, and the network side device may determine the beam direction information by a Random Access Channel (RACH) Occasion (RO) resource selected by the UE, and then the network side device may determine the slot formats corresponding to the plurality of slot resources through the beam direction information. Thus, the indication information can be used to indicate the maximum common set which includes a plurality of slot resources corresponding to uplink slot(s) and flexible/special slot(s).

It should be noted that the present disclosure does not limit the sequence of step 501. The above description takes step 501 being performed before step 502 as an example. In actual applications, step 501 may be performed after step 502, or step 501 may be performed after step 503, or step 501 may be performed in parallel with step 502, or step 501 may be performed in parallel with step 503, or step 501 may be performed in parallel with steps 502 to 503, and embodiments of the present disclosure do not impose limitations on this.

In step 502, uplink grant information for the blind repetition is determined. The uplink grant information for the blind repetition is used to schedule repetition(s) of uplink information.

In step 503, slot formats corresponding to a plurality of slot resources respectively are obtained. The slot formats include at least one of: an uplink slot, a downlink slot, and a flexible/special slot.

In the embodiment of the present disclosure, steps 502 and 503 may be implemented in any manner in the embodiments of the present disclosure, which are not limited in embodiments of the present disclosure and will not be repeatedly described.

In step 504, at least one available slot resource is selected from the uplink slot and the flexible/special slot among the plurality of slot resources according to the uplink grant information for the blind repetition and the slot formats.

In a possible implementation of the present disclosure, the UE may determine a slot resource in the maximum common set as the at least one available slot resource.

In step 505, an actual available slot resource is determined from at least one available slot resource to perform blind repetition(s) of the uplink information.

In any one of embodiments of the present disclosure, the uplink information may include Msg3.

In the embodiment of the present disclosure, step 505 may be implemented in any manner in the embodiments of the present disclosure, which are not limited in embodiments of the present disclosure and will not be repeatedly described.

In the method for determining a slot resource for a blind repetition provided in embodiments of the present disclosure, the UE determines the uplink grant information for the blind repetition, the uplink grant information for the blind repetition is used to schedule repetition(s) of uplink information, and the UE obtains slot formats corresponding to a plurality of slot resources respectively, and the slot formats include at least one of an uplink slot, a downlink slot and a flexible/special slot. The UE selects at least one available slot resource from the uplink slot and the flexible/special slot among the plurality of slot resources according to the uplink grant information for the blind repetition and the slot formats, and determines an actual available slot resource from the at least one available slot resource to perform the blind repetition of the uplink information. In this way, the UE can determine a slot resource for transmission repetition of the uplink information from the plurality of slot resources, so as to ensure the reliability of the uplink information transmission, and enhance the coverage capability of uplink information transmission.

It should be noted that the above possible implementations can be performed individually or in combination, and the embodiments of the present disclosure do not limit this.

Figure 9:
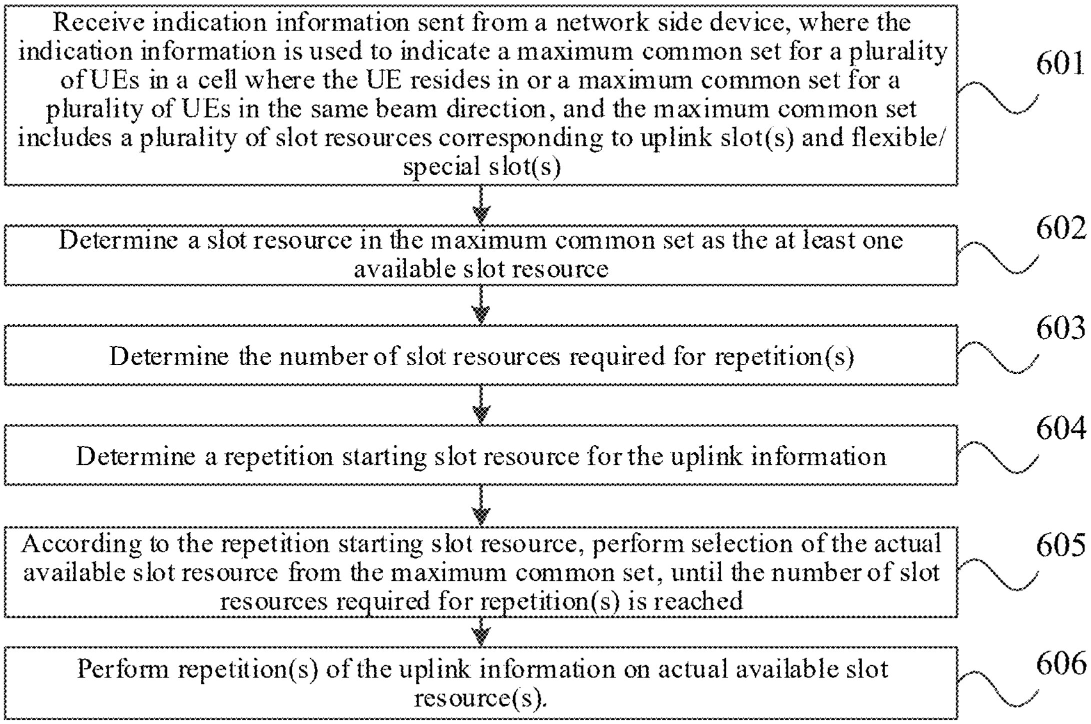
FIG. 9 is a schematic flowchart of another method for determining a slot resource for a blind repetition provided by an embodiment of the present disclosure.

An embodiment of the present disclosure provides another method for determining a slot resource for a blind repetition. FIG. 9 is a schematic flowchart of another method for determining a slot resource for a blind repetition provided by an embodiment of the present disclosure. The method for determining a slot resource for a blind repetition may be performed by a UE. The method for determining a slot resource for a blind repetition may be performed individually, or may be performed in combination with any embodiment or a possible implementation in an embodiment of the present disclosure, or may be performed in combination with any technical solution in related art.

As shown in FIG. 9, the method for determining a slot resource for a blind repetition may include the following steps:

In step 601, indication information sent from a network side device is received. The indication information is used to indicate a maximum common set for a plurality of UEs in a cell where the UE resides in or a maximum common set for a plurality of UEs in the same beam direction. The maximum common set includes a plurality of slot resources corresponding to uplink slot(s) and flexible/special slot(s).

In step 602, a slot resource in the maximum common set is determined as at least one available slot resource.

In the embodiment of the present disclosure, steps 601 to 602 may be implemented in any manner in the embodiments of the present disclosure, which are not limited in embodiments of the present disclosure and will not be repeatedly described.

In step 603, the number of slot resources required for repetition(s) is determined.

In an embodiment of the present disclosure, the number of slot resources required by the UE for repetition(s) may be the number K of blind repetitions, i.e., the number of slot resources required for repetition(s) may be determined based on the uplink grant information for the blind repetition(s).

In step 604, a repetition starting slot resource for the uplink information is determined.

In an embodiment of the present disclosure, the repetition starting slot resource for the uplink information may be a slot resource corresponding to a slot position n+k2−1. That is, in the embodiment of the present disclosure, the UE may obtain the uplink grant information for the blind repetition sent by the network side device, and determine k2 based on the uplink grant information for the blind repetition, so that the UE may determine the repetition starting slot resource for the uplink information according to the slot position n where the uplink grant information for the blind repetition is received and k2.

In step 605, according to the repetition starting slot resource, selection of the actual available slot resource is performed from the maximum common set, until the number of slot resources required for repetition(s) is reached.

In the embodiment of the present disclosure, the UE may select actual available slot resource(s) from the maximum common set according to the repetition starting slot resource until the number of slot resources required for repetition(s) is reached.

In step 606, repetition(s) of the uplink information is performed on actual available slot resource(s).

In the embodiment of the present disclosure, after selecting the actual available slot resource(s), the UE can retransmit the uplink information on the actual available slot resource(s).

In the method for determining a slot resource for a blind repetition provided in embodiments of the present disclosure, the UE determines the uplink grant information for the blind repetition, the uplink grant information for the blind repetition is used to schedule repetition(s) of uplink information, and the UE obtains slot formats corresponding to a plurality of slot resources respectively, and the slot formats include at least one of an uplink slot, a downlink slot and a flexible/special slot. The UE selects at least one available slot resource from the uplink slot and the flexible/special slot among the plurality of slot resources according to the uplink grant information for the blind repetition and the slot formats, and determines an actual available slot resource from the at least one available slot resource to perform the blind repetition of the uplink information. In this way, the UE can determine a slot resource for transmission repetition of the uplink information from the plurality of slot resources, so as to ensure the reliability of the uplink information transmission, and enhance the coverage capability of uplink information transmission.

It should be noted that the above possible implementations can be performed individually or in combination, and the embodiments of the present disclosure do not limit this.

Figure 10:
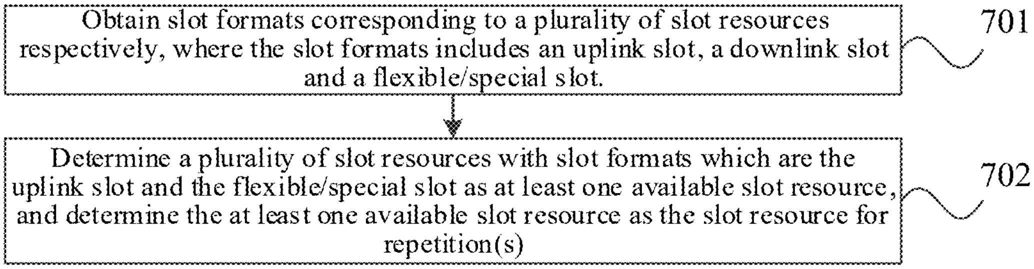
FIG. 10 is a schematic flowchart of another method for determining a slot resource for a blind repetition provided by an embodiment of the present disclosure.

An embodiment of the present disclosure provides another method for determining a slot resource for a blind repetition. FIG. 10 is a schematic flowchart of another method for determining a slot resource for a blind repetition provided by an embodiment of the present disclosure. The method for determining a slot resource for a blind repetition may be performed by a network side device. The method for determining a slot resource for a blind repetition may be performed individually, or may be performed in combination with any embodiment or a possible implementation in an embodiment of the present disclosure, or may be performed in combination with any technical solution in related art.

As shown in FIG. 10, the method for determining a slot resource for a blind repetition may include the following steps:

In step 701, slot formats corresponding to a plurality of slot resources respectively are obtained. The slot formats include an uplink slot, a downlink slot and a flexible/special slot.

In the embodiment of the present disclosure, the network side device may determine the slot formats corresponding to a plurality of slot resources respectively, where the slot formats include an uplink slot, a downlink slot and a flexible/special slot.

In step 702, a plurality of slot resources with slot formats which are the uplink slot and the flexible/special slot are determined as at least one available slot resource, and the at least one available slot resource is determined as the slot resource for repetition(s).

In the embodiment of the present disclosure, the network side device may determine a plurality of slot resources with slot formats which are the uplink slot and the flexible/special slot as at least one available slot resource, and determine the at least one available slot resource as the slot resource for repetition(s), so that the network side device can monitor the uplink information which is blindly retransmitted by a UE in the slot resource for repetition(s).

In a possible implementation of the embodiment of the present disclosure, the network side device may further send uplink grant information for a blind repetition to a UE, where the uplink grant information for the blind repetition is used to schedule repetition(s) of uplink information.

In a possible implementation of the embodiment of the present disclosure, the network side device may further send indication information to a UE, where the indication information is used to indicate a maximum common set for at least one UE in a cell where the UE resides in or a maximum common set for at least one UE in a same beam direction.

In a possible implementation of the embodiment of the present disclosure, the uplink information is Msg3.

It should be noted that the previous description and explanations about the method for determining the slot resource for a blind repetition performed at the UE side in any of the embodiments shown in FIG. 3 to FIG. 9 are also applicable to the method for determining the slot resource for a blind repetition performed at the network side device side in this embodiment, the implementation principle is similar and repeated descriptions will be omitted here.

In the method for determining the slot resource for a blind repetition in the embodiments of the present disclosure, the network side device determines the slot formats corresponding to a plurality of slot resources respectively, where the slot formats include an uplink slot, a downlink slot and a flexible/special slot, and determines a plurality of slot resources with slot formats which are the uplink slot and the flexible/special slot as at least one available slot resource, and determines at least one available slot resource as the slot resource for repetition(s). In this way, the network side device determines at least one available slot resource, so that the network side device can monitor the uplink information which is blindly retransmitted by the UE on the available slot resource, which can ensure the reliability of the uplink information transmission and enhance the coverage capability of the uplink information transmission.

It should be noted that the above possible implementations can be performed individually or in combination, and the embodiments of the present disclosure do not limit this.

In one embodiment of the present disclosure, the uplink information is Msg3 as an example. In order to increase the coverage capability of Msg3, as many available slot resources as possible can be obtained in the following methods.

In a first method, for Msg3 transmission repetition in a connected mode, starting from K2 offset, one uplink slot or flexible slot/special slot (configured by TDD-UL-DL-ConfigurationCommon signaling) can be counted as one available slot resource.

That is to say, in the connected state, when Msg3 blind repetition(s) is performed, both the UE side and the network side device side determine the available slot resource(s) through the slot formats configured by TDD-UL-DL-ConfigurationCommon signaling. That is, downlink slot(s) configured by TDD-UL-DL-ConfigurationCommon signaling is (are) excluded, and uplink slot(s) and flexible slot(s)/special slot(s) are counted as available slot resource(s).

As shown in FIG. 7, assuming that the number K of blind repetitions indicated by the network side device is 8, because the second F slot configured in TDD-UL-DL-Configuration-Common signaling is indicated as a downlink slot by TDD-UL-DL-ConfigurationDedicated signaling, the UE may determine the second F slot indicated by the TDD-UL-DL-ConfigurationCommon signaling in FIG. 7 as an actual unavailable slot resource. Therefore, the actual number of Msg3 transmissions is 7.

In the first method, the UE side behaviors are as follows:

In the RRC connected state, when the UE is configured with TDD-UL-DL-ConfigurationDedicated or receives an SFI indication, the UE performs blind repetition(s) of Msg3 according to slot formats determined by UE specific+cell specific configurations. For example, as shown in FIG. 7, the second F slot determined by TDD-UL-DL-Configuration-Common signaling is indicated as a downlink slot by TDD-UL-DL-ConfigurationDedicated signaling, and the UE does not perform actual Msg3 transmission on this slot. However, because this slot is indicated as an F slot by TDD-UL-DL-ConfigurationCommon signaling, the UE side still determines this slot as a transmission resource for Msg3. That is, the final uplink transmission at the UE side is the actual transmission of uplink information on the slot resource(s) jointly determined by the UE through TDD-UL-DL-ConfigurationCommon signaling and TDD-UL-DL-ConfigurationDedicated signaling or SFI information.

The network side device behaviors are as follows:

The network side device determines a F slot and a U slot as slot resources used for Msg3 blind repetition(s) through TDD-UL-DL-ConfigurationCommon signaling. The network side device attempts to receive Msg3 on both the F slot and the U slot. Even when UE specific signaling (such as TDD-UL-DL-ConfigurationDedicated signaling or SFI information) rewrites the F slot into a D slot and the UE does not send Msg3 in the F slot, the network side device still monitors, in this F slot, Msg3 which is blindly retransmitted by the UE.

In the above solutions, in a special slot determined through TDD-UL-DL-ConfigurationCommon signaling, if a symbol resource allocated for Msg3 includes a downlink symbol, the slot cannot be determined as a slot used for Msg3 transmission.

In one embodiment of the present disclosure, when certain symbols are allocated for SSB transmission and are not indicated as flexible symbols by TDD-UL-DL-ConfigurationCommon signaling, and these symbols are located in the symbol resources allocated for Msg3, the slot cannot be determined as a slot used for Msg3 transmission, that is, it is determined to be an actual unavailable slot resource.

In a second method, the network side device notifies a cell of a specific available slot resource indication, and all UEs in the cell count the number of transmission repetitions based on the same available slot resource indication.

As an example, the network side device may indicate a maximum common set (intersection) of uplink slot(s) and F slot(s) of all UEs in the cell, and both the network side device and the UE perform determination of the slot resource(s) for Msg3 blind repetition(s) through this indication information or indication signaling. That is to say, after k2 offset, an uplink slot or a F slot in the maximum common set is counted as one available slot resource, until the number of available slot resources is equal to number of Msg3 blind repetitions.

As another example, the network side device may indicate a maximum common set of uplink slot(s) and F slot(s) for all UEs in the same beam direction in a cell. Both the network side device and the UE perform determination of the slot resource(s) for Msg3 blind repetition(s) through this indication information or indication signaling.

In an embodiment of the present disclosure, the network side device may, through cell specific signaling, perform semi-static configuration (only one of the above two methods can be configured) for the first method and the following method in which only an uplink slot in TDD-UL-DL-ConfigurationCommon signaling is used for Msg3 blind repetition(s), and one configuration is valid for all UEs in the cell.

In an embodiment of the present disclosure, the above signaling may be Remaining Minimum System Information (RMSI), and so on.

Therefore, in the RRC connected state, when contention-based random access is performed, the above solutions can determine the available slot resource(s) used for Msg3 blind repetition(s), and can obtain as many available slot resource(s) as possible, thereby enhancing the coverage capability of Msg3 transmission.

Figure 11:
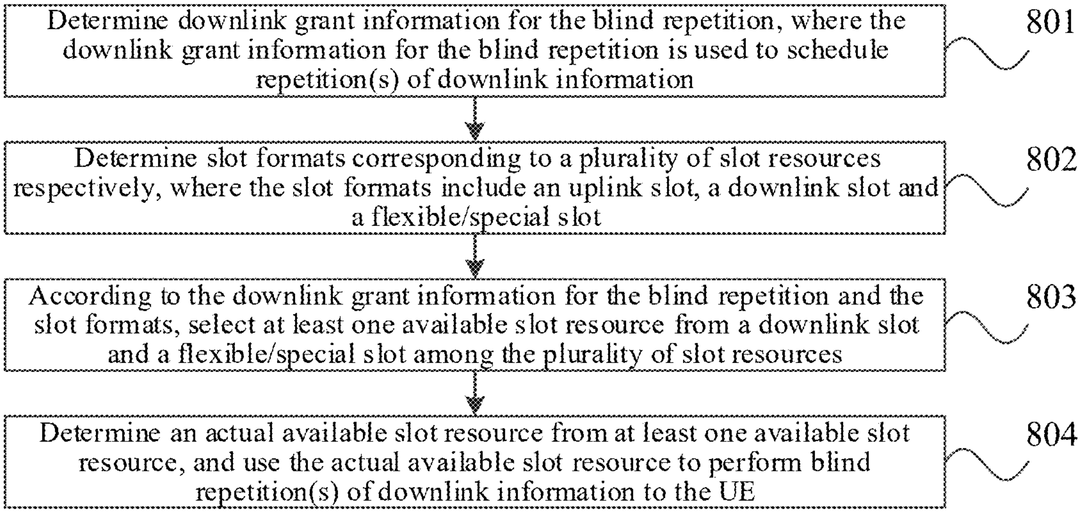
FIG. 11 is a schematic flowchart of another method for determining a slot resource for a blind repetition provided by an embodiment of the present disclosure.

An embodiment of the present disclosure provides another method for determining a slot resource for a blind repetition. FIG. 11 is a schematic flowchart of another method for determining a slot resource for a blind repetition provided by an embodiment of the present disclosure. The method for determining a slot resource for a blind repetition may be performed by a network side device. The method for determining a slot resource for a blind repetition may be performed individually, or may be performed in combination with any embodiment or a possible implementation in an embodiment of the present disclosure, or may be performed in combination with any technical solution in related art.

As shown in FIG. 11, the method for determining a slot resource for a blind repetition may include the following steps:

In step 801, downlink grant information for the blind repetition is determined. The downlink grant information for the blind repetition is used to schedule repetition(s) of downlink information.

In an embodiment of the present disclosure, the network side device may generate or determine downlink grant information for the blind repetition, and the downlink grant information for the blind repetition is used to schedule repetition(s) of downlink information.

In step 802, slot formats corresponding to a plurality of slot resources respectively are determined. The slot formats include an uplink slot, a downlink slot and a flexible/special slot.

In an embodiment of the present disclosure, a slot format may include at least one of: an uplink slot (or called as UL slot, U slot), a downlink slot (or called as DL slot, D slot), a flexible slot (or called as F slot)/special slot (or called as S slot).

In an embodiment of the present disclosure, the network side device may determine the slot formats corresponding to a plurality of slot resources respectively.

In step 803, according to the downlink grant information for the blind repetition and the slot formats, at least one available slot resource is selected from a downlink slot and a flexible/special slot among the plurality of slot resources.

It can be understood that an uplink slot cannot be used to transmit downlink information. Therefore, in the embodiments of the present disclosure, the network side device can, according to the downlink grant information for the blind repetition and the slot formats, select at least one slot from the downlink slot and the flexible/special slot among the plurality of slot resources as available slot resource(s).

In step 804, an actual available slot resource is determined from at least one available slot resource, and the actual available slot resource is used to perform blind repetition(s) of downlink information to the UE.

In an embodiment of the present disclosure, the network side device may determine the actual available slot resource from the at least one available slot resource, so that the actual available slot resource can be used to perform blind repetition(s) of downlink information, that is, the downlink information can be retransmitted on the actual available slot resource.

In the method for determining a slot resource for a blind repetition in the embodiments of the present disclosure, the network side device determines the downlink grant information for the blind repetition, where the downlink grant information for the blind repetition is used to schedule the repetition(s) of downlink information. And, the network side device determines slot formats corresponding to a plurality of slot resources respectively, where the slot formats include an uplink slot, a downlink slot and a flexible/special slot. According to the downlink grant information for the blind repetition and slot formats, the network side device selects at least one available slot resource from the downlink slot and the flexible/special slot among the plurality of slot resources, determines the actual available slot resource from the at least one available slot resource, and uses the actual available slot resource to blindly retransmit the downlink information to the UE. In this way, the network side device can determine the slot resource(s) for transmission repetition of the downlink information from a plurality of slot resources to ensure the reliability of downlink information transmission and enhance the coverage capability of downlink information transmission.

It should be noted that the above possible implementations can be performed individually or in combination, and the embodiments of the present disclosure do not limit this.

Figure 12:
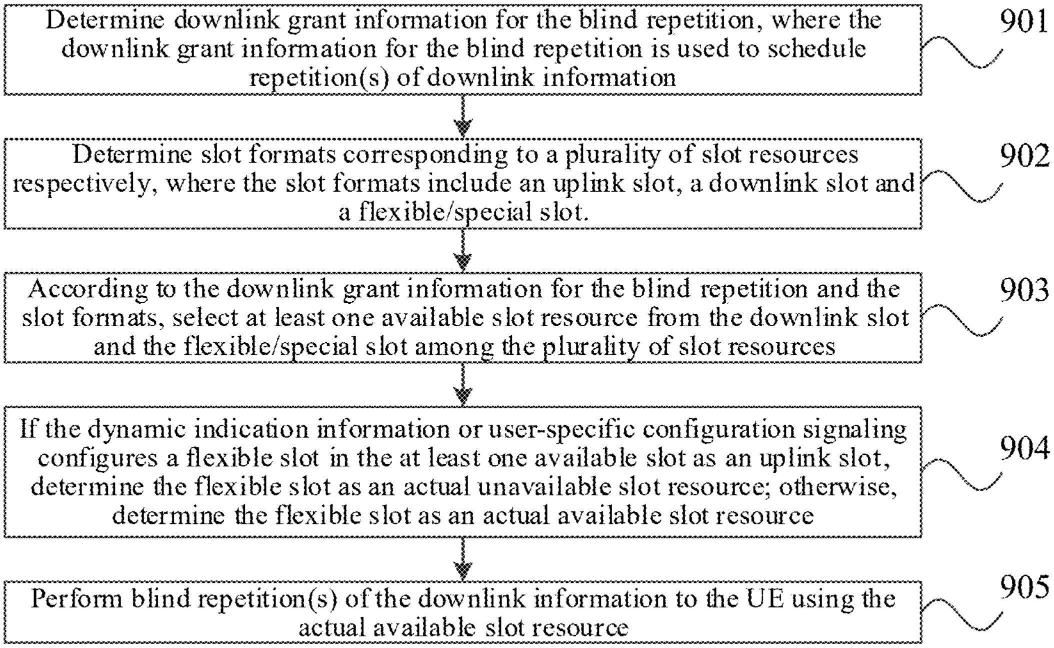
FIG. 12 is a schematic flowchart of another method for determining a slot resource for a blind repetition provided by an embodiment of the present disclosure.

An embodiment of the present disclosure provides another method for determining a slot resource for a blind repetition. FIG. 12 is a schematic flowchart of another method for determining a slot resource for a blind repetition provided by an embodiment of the present disclosure. The method for determining a slot resource for a blind repetition may be performed by a network side device. The method for determining a slot resource for a blind repetition may be performed individually, or may be performed in combination with any embodiment or a possible implementation in an embodiment of the present disclosure, or may be performed in combination with any technical solution in related art.

As shown in FIG. 12, the method for determining a slot resource for a blind repetition may include the following steps:

In step 901, downlink grant information for the blind repetition is determined. The downlink grant information for the blind repetition is used to schedule repetition(s) of downlink information.

In step 902, slot formats corresponding to a plurality of slot resources respectively are determined. The slot formats include an uplink slot, a downlink slot and a flexible/special slot.

In an embodiment of the present disclosure, steps 901 to 902 may be implemented in any manner in the embodiments of the present disclosure, which are not limited in embodiments of the present disclosure and will not be repeatedly described.

In one embodiment of the present disclosure, slot formats may be configured by cell common signaling. That is, the network side device may configure the slot format corresponding to each slot resource through cell common signaling. The cell common signaling is valid for a plurality of UEs in a cell. For example, the cell common signaling is valid for all UEs in the cell. Taking the cell common signaling being TDD-UL-DL-ConfigurationCommon signaling as an example, the network side device may determine the slot formats corresponding to a plurality of slot resources respectively, and configure the slot formats corresponding to the plurality of slot resources through TDD-UL-DL-ConfigurationCommon signaling. The TDD-UL-DL-ConfigurationCommon signaling is valid for all UEs in the cell where the UE resides in.

In step 903, according to the downlink grant information for the blind repetition and the slot formats, at least one available slot resource is selected from the downlink slot and the flexible/special slot among the plurality of slot resources.

In the embodiment of the present disclosure, step 903 may be implemented in any manner in the embodiments of the present disclosure, which are not limited in embodiments of the present disclosure and will not be repeatedly described.

In an embodiment of the present disclosure, if on a certain flexible slot resource, a symbol resource determined according to the downlink grant information for the blind repetition includes an uplink symbol, the flexible slot resource is not used as an available slot resource.

In an embodiment of the present disclosure, if on a certain flexible slot resource, a symbol resource determined according to the downlink grant information for the blind repetition does not include an uplink symbol, the flexible slot resource is used as an available slot resource.

In one embodiment of the present disclosure, if a symbol on a certain flexible slot resource is allocated for SSB and the symbol is located within a symbol resource allocated for downlink information, the flexible slot resource is not used as an available slot resource.

In an embodiment of the present disclosure, if a symbol on a certain flexible slot resource is not allocated for SSB and the symbol is located within a symbol resource allocated for downlink information, the flexible slot resource is used as an available slot resource. Alternatively, if a symbol on a certain flexible slot resource is not allocated for SSB and the symbol is not located within a symbol resource allocated for downlink information, the flexible slot resource is used as an available slot resource. Alternatively, if a symbol on a certain flexible slot resource is allocated as for SSB and the symbol is not located within a symbol resource allocated for downlink information, the flexible slot resource is used as an available slot resource.

In step 904, if the dynamic indication information or user-specific configuration signaling configures a flexible slot in the at least one available slot as an uplink slot, the flexible slot is determined as an actual unavailable slot resource; otherwise, the flexible slot is determined as an actual available slot resource.

In an embodiment of the present disclosure, if dynamic indication information or user-specific configuration signaling configures a flexible slot among at least one available slot as an uplink slot, the network side device may determine the flexible slot as an actual unavailable slot resource. If the dynamic indication information or user-specific configuration signaling does not configure a flexible slot in the at least one available slot as an uplink slot, the network side device may determine the flexible slot as an actual available slot resource.

For example, the dynamic indication information is SFI information, and the user-specific configuration signaling is TDD-UL-DL-ConfigurationDedicated signaling. The network side device may configure the slot formats corresponding to the slot resources through TDD-UL-DL-ConfigurationCommon signaling. Assuming that the second F slot configured by TDD-UL-DL-ConfigurationCommon signaling is indicated as an uplink slot by TDD-UL-DL-ConfigurationDedicated signaling, the network side device may determine the second F slot indicated by TDD-UL-DL-ConfigurationCommon signaling as an actual unavailable slot resource, so that the network side device may not perform repetition(s) of the downlink information on the actual unavailable slot resource.

In step 905, blind repetition(s) of the downlink information to the UE is performed using the actual available slot resource.

In any one of the embodiments of the present disclosure, the downlink information may include at least one of: a message 2 (i.e., Msg2), a message 4 (i.e., Msg4) and a paging message.

In the method for determining a slot resource for a blind repetition in the embodiments of the present disclosure, the network side device determines the downlink grant information for the blind repetition, where the downlink grant information for the blind repetition is used to schedule the repetition(s) of downlink information. And, the network side device determines slot formats corresponding to a plurality of slot resources respectively, where the slot formats include an uplink slot, a downlink slot and a flexible/special slot. According to the downlink grant information for the blind repetition and slot formats, the network side device selects at least one available slot resource from the downlink slot and the flexible/special slot among the plurality of slot resources, determines the actual available slot resource from the at least one available slot resource, and uses the actual available slot resource to blindly retransmit the downlink information to the UE. In this way, the network side device can determine the slot resource(s) for transmission repetition of downlink information from a plurality of slot resources to ensure the reliability of downlink information transmission and enhance the coverage capability of downlink information transmission.

It should be noted that the above possible implementations can be performed individually or in combination, and the embodiments of the present disclosure do not limit this.

Figure 13:
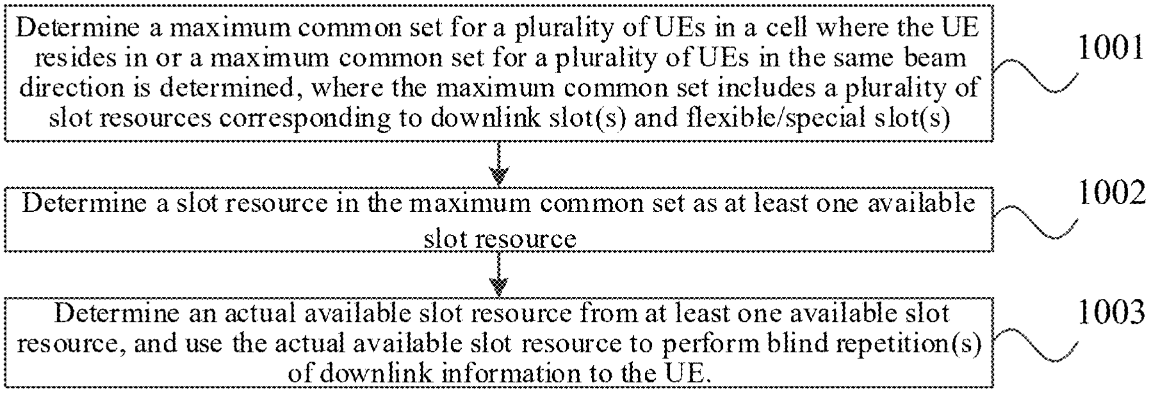
FIG. 13 is a schematic flowchart of another method for determining a slot resource for blind repetition provided by an embodiment of the present disclosure.

An embodiment of the present disclosure provides another method for determining a slot resource for a blind repetition. FIG. 13 is a schematic flowchart of another method for determining a slot resource for a blind repetition provided by an embodiment of the present disclosure. The method for determining a slot resource for a blind repetition may be performed by a network side device. The method for determining a slot resource for a blind repetition may be performed individually, or may be performed in combination with any embodiment or a possible implementation in an embodiment of the present disclosure, or may be performed in combination with any technical solution in related art.

As shown in FIG. 13, the method for determining a slot resource for a blind repetition may include the following steps:

In step 1001, a maximum common set for a plurality of UEs in a cell where the UE resides in or a maximum common set for a plurality of UEs in the same beam direction is determined. The maximum common set includes a plurality of slot resources corresponding to downlink slot(s) and flexible/special slot(s).

In a possible implementation of the embodiment of the present disclosure, the network side device may determine the maximum common set for a plurality of UEs in the cell where the UE resides in. The maximum common set may include a plurality of slot resources corresponding to downlink slot(s) and flexible/special slot(s).

As an example, the network side device may determine the maximum common set of downlink slot(s) and flexible slot(s)/special slot(s) for all UEs in the cell where the UE resides in.

In another possible implementation of the embodiment of the present disclosure, the network side device may determine the maximum common set for a plurality of UEs in the same beam direction in the cell where the UE resides in. The maximum common set may include a plurality of slot resources corresponding to downlink slot(s) and flexible/special slot(s).

As an example, the network side device may determine the maximum common set of downlink slot(s) and flexible slot(s)/special slot(s) for all UEs in the same beam direction in the cell where the UE resides in.

In a RRC connected state, the network side device may know information of all terminals in a beam direction, and the network side device may determine the beam direction information by a Random Access Channel (RACH) Occasion (RO) resource selected by the UE, and then the network side device may determine the slot formats corresponding to the plurality of slot resources through the beam direction information. Thus, the maximum common set which includes a plurality of slot resources corresponding to downlink slot(s) and flexible/special slot(s) can be determined.

In step 1002, a slot resource in the maximum common set is determined as at least one available slot resource.

In the embodiment of the present disclosure, the UE may determine a slot resource in the maximum common set as at least one available slot resource.

In step 1003, an actual available slot resource is determined from at least one available slot resource, and the actual available slot resource is used to blindly retransmit downlink information to the UE.

In the embodiment of the present disclosure, step 1003 may be implemented in any manner in the embodiments of the present disclosure, which are not limited in embodiments of the present disclosure and will not be repeatedly described.

In the method for determining a slot resource for a blind repetition in the embodiments of the present disclosure, the network side device determines the downlink grant information for the blind repetition, where the downlink grant information for the blind repetition is used to schedule the repetition(s) of downlink information. And, the network side device determines slot formats corresponding to a plurality of slot resources respectively, where the slot formats include an uplink slot, a downlink slot and a flexible/special slot. According to the downlink grant information for the blind repetition and slot formats, the network side device selects at least one available slot resource from the downlink slot and the flexible/special slot among the plurality of slot resources, determines the actual available slot resource from the at least one available slot resource, and uses the actual available slot resource to blindly retransmit the downlink information to the UE. In this way, the network side device can determine, from a plurality of slot resources, the slot resource(s) for transmission repetition of the downlink information, so as to ensure the reliability of downlink information transmission and enhance the coverage capability of downlink information transmission.

It should be noted that the above possible implementations can be performed individually or in combination, and the embodiments of the present disclosure do not limit this.

Figure 14:
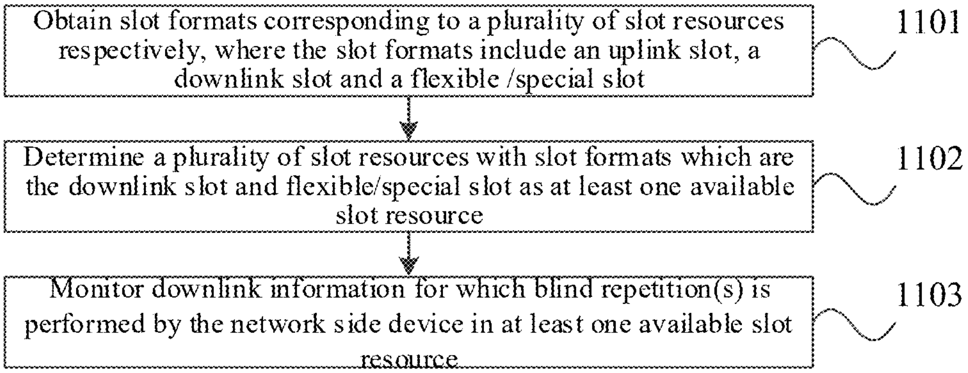
FIG. 14 is a schematic flowchart of another method for determining a slot resource for a blind repetition provided by an embodiment of the present disclosure.

An embodiment of the present disclosure provides another method for determining a slot resource for a blind repetition. FIG. 14 is a schematic flowchart of another method for determining a slot resource for a blind repetition provided by an embodiment of the present disclosure. The method for determining a slot resource for a blind repetition may be performed by a UE. The method for determining a slot resource for a blind repetition may be performed individually, or may be performed in combination with any embodiment or a possible implementation in an embodiment of the present disclosure, or may be performed in combination with any technical solution in related art.

As shown in FIG. 14, the method for determining a slot resource for a blind repetition may include the following steps:

In step 1101, slot formats corresponding to a plurality of slot resources respectively are obtained. The slot formats include an uplink slot, a downlink slot and a flexible/special slot.

In step 1102, a plurality of slot resources with slot formats which are the downlink slot and flexible/special slot are determined as at least one available slot resource.

In step 1103, downlink information which is blindly retransmitted by the network side device is monitored in at least one available slot resource.

In a possible implementation of the embodiment of the present disclosure, the slot formats are configured by cell common signaling.

In a possible implementation of the embodiment of the present disclosure, the downlink information includes at least one of: Msg2, Msg4 and a paging message.

It should be noted that the previous description and explanations about the method for determining the slot resource for a blind repetition performed at the network side device side in any of the embodiments shown in FIG. 11 to FIG. 13 are also applicable to the method for determining the slot resource for a blind repetition performed at the UE side in this embodiment, the implementation principle is similar and repeated descriptions will be omitted here.

In the method for determining a slot resource for a blind repetition in the embodiments of the present disclosure, the UE obtains the slot formats corresponding to the plurality of slot resources, where the slot formats include an uplink slot, a downlink slot and a flexible/special slot. The UE determines a plurality of slot resources with slot formats of the downlink slot and flexible/special slot as at least one available slot resource, and monitors the downlink information which is blindly retransmitted by the network side device in the available slot resource. In this way, the UE determines at least one available slot resource, so that the UE can monitor the downlink information blindly retransmitted by the network side device on the available slot resource, which can ensure the reliability of downlink information transmission and enhance the coverage capability of downlink information transmission.

It should be noted that the above possible implementations can be performed individually or in combination, and the embodiments of the present disclosure do not limit this.

Corresponding to the methods for determining a slot resource for a blind repetition provided by the embodiments of FIG. 3 to FIG. 9, the present disclosure also provides apparatuses for determining a slot resource for a blind repetition. The apparatuses for determining a slot resource for a blind repetition correspond to the methods for determining a slot resource for a blind repetition provided in the above embodiments of FIG. 3 to FIG. 9, and therefore the implementations of the methods for determining a slot resource for a blind repetition are also applicable to apparatuses for determining a slot resource for a blind repetition, and detailed descriptions will be omitted in embodiments of the present disclosure.

Figure 15:
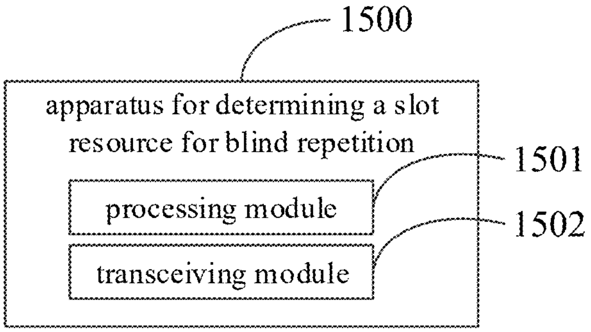
FIG. 15 is a schematic structural diagram of an apparatus for determining a slot resource for a blind repetition provided by an embodiment of the present disclosure.

FIG. 15 is a schematic structural diagram of an apparatus for determining a slot resource for a blind repetition provided by an embodiment of the present disclosure. The apparatus may be applied in a UE.

As shown in FIG. 15, the apparatus 1500 for determining a slot resource for a blind repetition may include a processing module 1501 and a transceiving module 1502.

The processing module 1501 is configured to determine uplink grant information for the blind repetition, where the uplink grant information for the blind repetition is used to schedule repetition(s) of uplink information.

The processing module 1501 is further configured to obtain slot formats corresponding to a plurality of slot resources respectively, where the slot formats include at least one of an uplink slot, a downlink slot and a flexible/special slot.

The processing module 1501 is further configured to select at least one available slot resource from the uplink slot and the flexible/special slot among the plurality of slot resources according to the uplink grant information for the blind repetition and the slot formats.

The processing module 1501 is further configured to determine an actual available slot resource from the at least one available slot resource.

The transceiving module 1502 is configured to perform blind repetition(s) of the uplink information using the actual available slot resource.

Optionally, the processing module 1501 is specifically configured to: obtain the number K of blind repetitions and a slot offset value k2 corresponding to the uplink grant information for the blind repetition(s); and based on the number K of blind repetitions and the slot offset value k2, determine, among slots after a slot n+k2−1, K of slot resources with slot formats which are the uplink slot and the flexible/special slot as the available slot resource, where n is a slot in which the uplink grant information for the blind repetition(s) is received.

Optionally, the slot formats are configured by cell common signaling.

Optionally, the processing module 1501 is specifically configured to: if on a flexible slot resource, a symbol resource determined according to the uplink grant information for the blind repetition includes a downlink symbol, the flexible slot resource is not determined as the available slot resource; if on the flexible slot resource, the symbol resource determined according to the uplink grant information for the blind repetition does not include the downlink symbol, the flexible slot resource is determined as the available slot resource.

Optionally, the processing module 1501 is specifically configured to: if a symbol on a flexible slot resource are allocated for transmitting a Synchronization Signal Block (SSB) and the symbol is located within a symbol resource allocated for the uplink information, the flexible slot resource is not determine as the available slot resource; otherwise, the flexible slot resource is determined as the available slot resource.

Optionally, the processing module 1501 is specifically configured to: if dynamic indication information or user-specific configuration signaling configures a flexible slot in the at least one available slot as a downlink slot, determine the flexible slot as an actual unavailable slot resource; otherwise, determine the flexible slot as the actual available slot resource.

Optionally, the transceiving module 1502 is further configured to receive indication information sent by the network side device, where the indication information is used to indicate a maximum common set for a plurality of UEs in a cell where the UE resides in or a maximum common set for a plurality of UEs in a same beam direction, where the maximum common set includes a plurality of slot resources corresponding to uplink slot(s) and flexible/special slot(s).

Optionally, the processing module 1501 is specifically configured to determine a slot resource in the maximum common set as at least one available slot resource.

Optionally, the processing module 1501 is specifically configured to: determine the number of slot resources required for repetition(s); determine a repetition starting slot resource for the uplink information; and according to the repetition starting slot resource, perform selection of the actual available slot resource from the maximum common set, until the number of slot resources required for repetition(s) is reached.

Optionally, the transceiving module 1502 is specifically configured to retransmit the uplink information on the actual available slot resource.

Optionally, the uplink information is Msg3.

In the apparatus for determining a slot resource for a blind repetition provided in embodiments of the present disclosure, the UE determines the uplink grant information for the blind repetition, the uplink grant information for the blind repetition is used to schedule repetition(s) of uplink information, and the UE obtains slot formats corresponding to a plurality of slot resources respectively, and the slot formats include at least one of an uplink slot, a downlink slot and a flexible/special slot. The UE selects at least one available slot resource from the uplink slot and the flexible/special slot among the plurality of slot resources according to the uplink grant information for the blind repetition and the slot formats, and determines an actual available slot resource from the at least one available slot resource to perform the blind repetition of the uplink information. In this way, the UE can determine a slot resource for transmission repetition of the uplink information from the plurality of slot resources, so as to ensure the reliability of the uplink information transmission, and enhance the coverage capability of uplink information transmission.

Corresponding to the method for determining a slot resource for a blind repetition provided by the embodiment of FIG. 10, the present disclosure further provides an apparatus for determining a slot resource for a blind repetition. Since the apparatus for determining a slot resource for a blind repetition provided by the embodiment of the present disclosure corresponds to the method for determining a slot resource for a blind repetition provided in the embodiment of FIG. 10 above, the implementations of the method for determining a slot resource for a blind repetition are also applicable to the apparatus for determining a slot resource for a blind repetition provided by the embodiment of the present disclosure, and thus detailed description will be omitted here.

Figure 16:
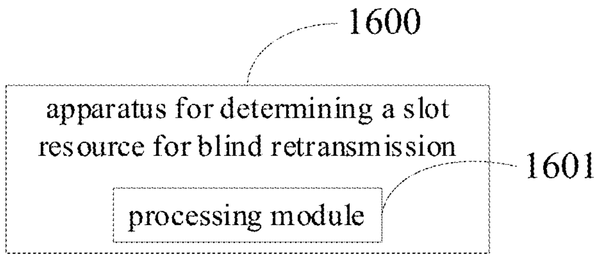
FIG. 16 is a schematic structural diagram of another apparatus for determining a slot resource for a blind repetition provided by an embodiment of the present disclosure.

FIG. 16 is a schematic structural diagram of another apparatus for determining a slot resource for a blind repetition provided by an embodiment of the present disclosure. The apparatus may be applied to a network side device.

As shown in FIG. 16, the apparatus 1600 for determining a slot resource a for blind repetition may include a processing module 1601.

The processing module 1601 is configured to determine slot formats corresponding to a plurality of slot resources, where the slot formats include an uplink slot, a downlink slot and a flexible/special slot.

The processing module 1601 is further configured to determine a plurality of slot resources with slot formats which are the uplink slot and flexible/special slot as at least one available slot resource, and determine the at least one available slot resource as a slot resource for the repetition(s).

Optionally, the processing module 1601 is further configured to monitor uplink information which is blindly retransmitted by a UE in the slot resource for repetition(s).

Optionally, the apparatus 1600 for determining a slot resource for blind repetition(s) may further include:

a transceiving module configured to send uplink grant information for blind repetition(s) to a UE, where the uplink grant information for blind repetition(s) is used to schedule repetition(s) of uplink information.

Optionally, the transceiving module is further configured to send indication information to the UE, where the indication information is used to indicate a maximum common set for at least one UE in a cell where the UE resides in or a maximum common set for at least one UE in the same beam direction.

Optionally, the uplink information is Msg3.

In the apparatus for determining a slot resource for a blind repetition provided in embodiments of the present disclosure, the network side device determines the slot formats corresponding to a plurality of slot resources respectively, where the slot formats include an uplink slot, a downlink slot and a flexible/special slot, and determines a plurality of slot resources with slot formats which are the uplink slot and the flexible/special slot as at least one available slot resource, and determines at least one available slot resource as the slot resource for repetition(s). In this way, the network side device determines at least one available slot resource, so that the network side device can monitor the uplink information which is blindly retransmitted by the UE on the available slot resource, which can ensure the reliability of the uplink information transmission and enhance the coverage capability of the uplink information transmission.

Corresponding to the method for determining a slot resource for a blind repetition provided by the embodiments of FIG. 11 to FIG. 13, the present disclosure also provides an apparatus for determining a slot resource for a blind repetition. Since the apparatus for determining a slot resource for blind repetition provided by the embodiment of the present disclosure corresponds to the method for determining a slot resource for a blind repetition provided in the embodiments of FIGS. 11 to 13 above, the implementations of the method for determining a slot resource for a blind repetition are also applicable to the apparatus for determining a slot resource for a blind repetition, and thus detailed descriptions are omitted here.

Figure 17:
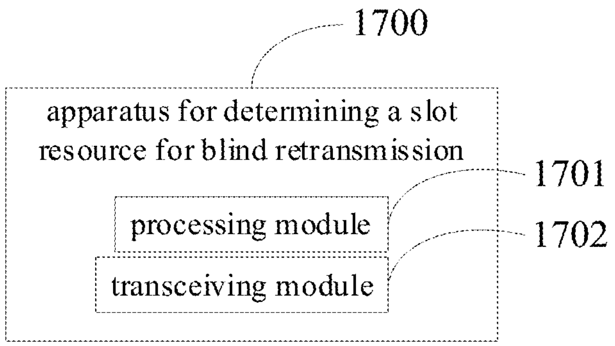
FIG. 17 is a schematic structural diagram of another apparatus for determining a slot resource for a blind repetition provided by an embodiment of the present disclosure.

FIG. 17 is a schematic structural diagram of another apparatus for determining a slot resource for a blind repetition provided by an embodiment of the present disclosure. The apparatus may be applied to a network side device.

As shown in FIG. 17, the apparatus 1700 for determining a slot resource for a blind repetition may include a processing module 1701 and a transceiving module 1702.

The processing module 1701 is configured to: determine downlink grant information for the blind repetition, where the downlink grant information for the blind repetition is used to schedule repetition(s) of downlink information; and determine slot formats corresponding to a plurality of slot resources respectively, where the slot formats include an uplink slot, a downlink slot and a flexible/special slot.

The processing module 1701 is further configured to: select at least one available slot resource from the downlink slot and the flexible/special slot among the plurality of slot resources according to the downlink grant information for the blind repetition and the slot formats.

The processing module 1701 is further configured to determine an actual available slot resource from at least one available slot resource.

The transceiving module 1702 is configured to blindly retransmit downlink information to a UE using the actual available slot resource.

Optionally, the processing module 1701 is specifically configured to: if on a flexible slot resource, a symbol resource determined according to the downlink grant information for the blind repetition includes an uplink symbol, not determine the flexible slot resource as the available slot resource; if on the flexible slot resource, the symbol resource determined according to the downlink grant information for the blind repetition does not include the uplink symbol, determine the flexible slot resource as the available slot resource.

Optionally, the processing module 1701 is specifically configured to: if a symbol on a flexible slot resource is allocated for transmitting a Synchronization Signal Block (SSB) and the symbol is located within a symbol resource allocated for the downlink information, not determine the flexible slot resource as the available slot resource; otherwise, determine the flexible slot resource as the available slot resource.

Optionally, the processing module 1701 is specifically configured to: if dynamic indication information or user-specific configuration signaling configures a flexible slot in the at least one available slot as an uplink slot, determine the flexible slot as an actual unavailable slot resource; otherwise, determine the flexible slot as the actual available slot resource.

Optionally, the processing module 1701 is further configured to: determine a maximum common set for a plurality of UEs in a cell where the UE resides in or a maximum common set for a plurality of UEs in the same beam direction, where the maximum common set includes a plurality of slot resources corresponding to the downlink slot(s) and the flexible/special slot(s).

Optionally, the processing module 1701 is specifically configured to determine a slot resource in the maximum common set as at least one available slot resource.

Optionally, the downlink information includes at least one of: Msg2, Msg4 and a paging message.

In the apparatus for determining a slot resource for a blind repetition in the embodiments of the present disclosure, the network side device determines the downlink grant information for the blind repetition, where the downlink grant information for the blind repetition is used to schedule the repetition of downlink information. And, the network side device determines slot formats corresponding to a plurality of slot resources respectively, where the slot formats include an uplink slot, a downlink slot and a flexible/special slot. According to the downlink grant information for the blind repetition and slot formats, the network side device selects at least one available slot resource from the downlink slot and the flexible/special slot among the plurality of slot resources, determines the actual available slot resource from the at least one available slot resource, and uses the actual available slot resource to blindly retransmit the downlink information to the UE. In this way, the network side device can determine the slot resource(s) for transmission repetition of the downlink information from a plurality of slot resources to ensure the reliability of downlink information transmission and enhance the coverage capability of downlink information transmission.

Corresponding to the method for determining a slot resource for a blind repetition provided by the embodiment of FIG. 14, the present disclosure also provides an apparatus for determining a slot resource for a blind repetition. Since the apparatus for determining a slot resource for a blind repetition provided by the embodiment of the present disclosure corresponds to the method for determining a slot resource for a blind repetition provided in the embodiment of FIG. 14 above, the implementations of the method for determining a slot resource for a blind repetition are also applicable to the apparatus for determining a slot resource for a blind repetition provided by the embodiment of the present disclosure, and thus detailed description will be omitted here.

Figure 18:
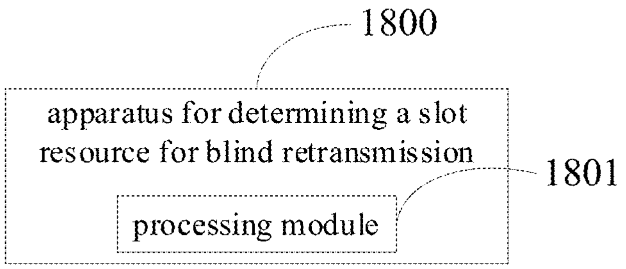
FIG. 18 is a schematic structural diagram of another apparatus for determining a slot resource for a blind repetition provided by an embodiment of the present disclosure.

FIG. 18 is a schematic structural diagram of another apparatus for determining a slot resource for a blind repetition provided by an embodiment of the present disclosure. The apparatus may be applied in a UE.

As shown in FIG. 18, the apparatus 1800 for determining a slot resource for a blind repetition may include a processing module 1801.

The processing module 1801 is configured to obtain slot formats corresponding to a plurality of slot resources, where the slot formats include an uplink slot, a downlink slot and a flexible/special slot.

The processing module 1801 is further configured to determine a plurality of slot resources with slot formats which are the downlink slot and the flexible/special slot as at least one available slot resource, and monitor downlink information which is blindly retransmitted by a network side device in the at least one available slot resource.

Optionally, the slot formats are configured by cell common signaling.

Optionally, the downlink information includes at least one of: Msg2, Msg4 and a paging message.

In the apparatus for determining a slot resource for a blind repetition in the embodiments of the present disclosure, the UE obtains the slot formats corresponding to the plurality of slot resources, where the slot formats include an uplink slot, a downlink slot and a flexible/special slot. The UE determines a plurality of slot resources with slot formats of the downlink slot and flexible/special slot as at least one available slot resource, and monitors the downlink information which is blindly retransmitted by the network side device in the available slot resource. In this way, the UE determines at least one available slot resource, so that the UE can monitor the downlink information blindly retransmitted by the network side device on the available slot resource, which can ensure the reliability of downlink information transmission and enhance the coverage capability of downlink information transmission.

In order to implement the above embodiments, the present disclosure proposes a communication device. The communication device includes a processor and a memory. A computer program is stored in the memory. The processor executes the computer program stored in the memory to cause the device to perform the methods described in the embodiments of FIG. 3 to FIG. 9, or to perform the methods described in the embodiment of FIG. 14. For example, the communication device may be the UE in the above embodiments.

In order to implement the above embodiments, the present disclosure proposes another communication device. The communication device includes a processor and a memory. A computer program is stored in the memory. The processor executes the computer program stored in the memory to cause the device to perform the methods described in the embodiment of FIG. 10, or to perform the methods described in the embodiments of FIG. 11 to FIG. 13. For example, the communication device may be the network side device in the above embodiments.

In order to implement the above embodiments, the present disclosure proposes a communication device. The communication device includes: a processor and an interface circuit. The interface circuit is configured to receive code instructions and transmit them to the processor. The processor is configured to run the code instructions to perform the methods described in any one of embodiments of FIG. 3 to FIG. 9, or to perform the method described in the embodiment of FIG. 14. For example, the communication device may be the UE in the above embodiments.

In order to implement the above embodiments, the present disclosure proposes another communication device. The communication device includes: a processor and an interface circuit. The interface circuit is configured to receive code instructions and transmit them to the processor. The processor is configured to run the code instructions to perform the method described in the embodiment in FIG. 10, or to perform the methods described in any one of embodiments in FIGS. 11 to 13. For example, the communication device may be the network side device in the above embodiments.

In order to implement the above embodiments, the present disclosure proposes a computer-readable storage medium for storing instructions. When the instructions are executed, the methods described in any one of embodiments in FIG. 3 to FIG. 9 or FIG. 14 are implemented.

In order to implement the above embodiments, the present disclosure proposes another computer-readable storage medium for storing instructions. When the instructions are executed, the methods described in any one of embodiments in FIG. 10 or FIG. 11 to FIG. 13 are implemented.

Figure 19:
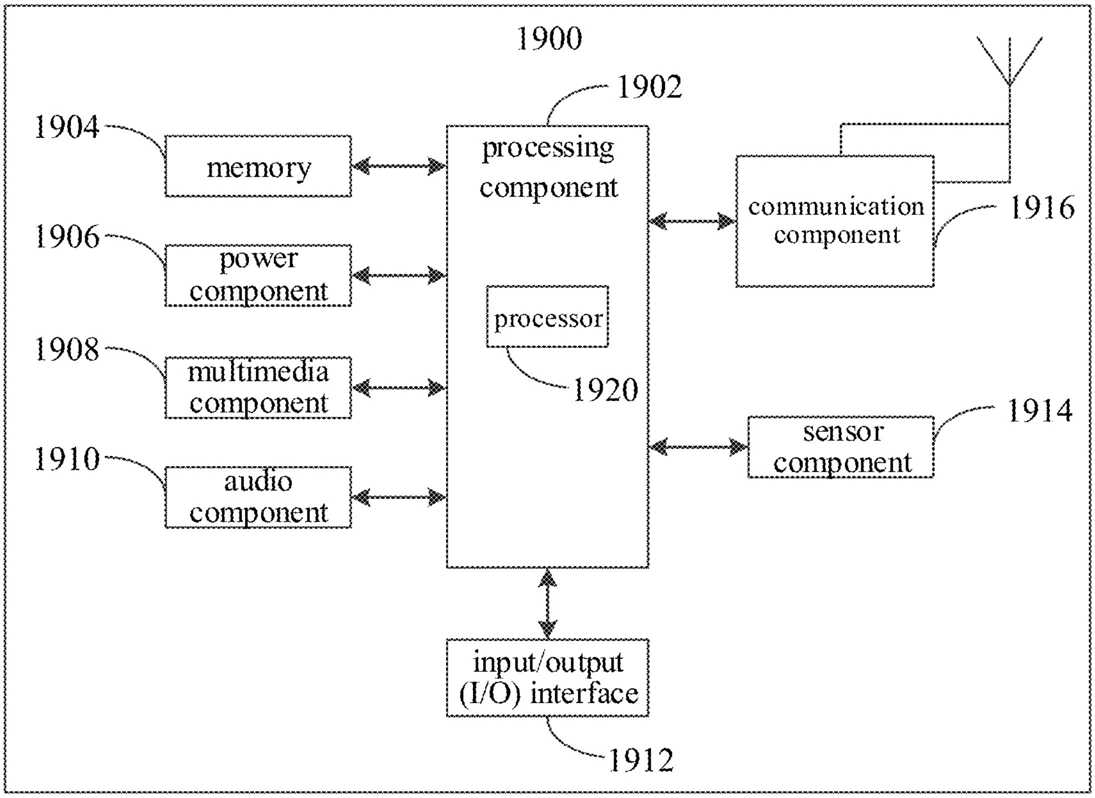
FIG. 19 is a block diagram of a UE provided by an embodiment of the present disclosure.

FIG. 19 is a block diagram of a UE provided by an embodiment of the present disclosure. For example, the UE 1900 may be a mobile phone, a computer, a digital broadcast user equipment, a messaging device, a gaming console, a tablet, a medical device, exercise equipment, a personal digital assistant, and the like.

Referring to FIG. 19, the UE 1900 may include at least one of the following components: a processing component 1902, a memory 1904, a power component 1906, a multimedia component 1908, an audio component 1910, an input/output (I/O) interface 1912, a sensor component 1914, and a communication component 1916.

The processing component 1902 typically controls overall operations of the UE 1900, such as the operations associated with display, telephone calls, data communications, camera operations, and recording operations. The processing component 1902 may include at least one processor 1920 to execute instructions to perform all or part of the steps in the above described methods. Moreover, the processing component 1902 may include at least one module which facilitates the interaction between the processing component 1902 and other components. For instance, the processing component 1902 may include a multimedia module to facilitate the interaction between the multimedia component 1908 and the processing component 1902.

The memory 1904 is configured to store various types of data to support the operation of the UE 1900. Examples of such data include instructions for any applications or methods operated on the UE 1900, contact data, phonebook data, messages, pictures, video, etc. The memory 1904 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1906 provides power to various components of the UE 1900. The power component 1906 may include a power management system, at least one power source, and any other components associated with the generation, management, and distribution of power in the UE 1900.

The multimedia component 1908 includes a screen providing an output interface between the UE 1900 and the user. In some embodiments, the screen may include a liquid crystal display (LCD) and a touch panel (TP). If the screen includes the touch panel, the screen may be implemented as a touch screen to receive input signals from the user. The touch panel includes at least one touch sensor to sense touches, swipes, and gestures on the touch panel. The touch sensor may not only sense a boundary of a touch or swipe action, but also sense a wake-up period of time and a pressure associated with the touch or swipe action. In some embodiments, the multimedia component 1908 includes a front camera and/or a rear camera. The front camera and the rear camera may receive an external multimedia datum while the UE 1900 is in an operation mode, such as a photographing mode or a video mode. Each of the front camera and the rear camera may be a fixed optical lens system or have focus and optical zoom capability.

The audio component 1910 is configured to output and/or input audio signals. For example, the audio component 1910 includes a microphone ("MIC") configured to receive an external audio signal when the UE 1900 is in an operation mode, such as a call mode, a recording mode, and a voice recognition mode. The received audio signal may be further stored in the memory 1904 or transmitted via the communication component 1916. In some embodiments, the audio component 1910 further includes a speaker to output audio signals.

The I/O interface 1912 provides an interface between the processing component 1902 and peripheral interface modules, such as a keyboard, a click wheel, buttons, and the like. The buttons may include, but are not limited to, a home button, a volume button, a starting button, and a locking button.

The sensor component 1914 includes at least one sensor to provide status assessments of various aspects of the UE 1900. For instance, the sensor component 1914 may detect an open/closed status of the UE 1900, relative positioning of components, e.g., the display and the keypad, of the UE 1900, a change in position of the UE 1900 or a component of the UE 1900, a presence or absence of user contact with the UE 1900, an orientation or an acceleration/deceleration of the UE 1900, and a change in temperature of the UE 1900. The sensor component 1914 may include a proximity sensor configured to detect the presence of nearby objects without any physical contact. The sensor component 1914 may also include a light sensor, such as a CMOS or CCD image sensor, for use in imaging applications. In some embodiments, the sensor component 1914 may also include an accelerometer sensor, a gyroscope sensor, a magnetic sensor, a pressure sensor, or a temperature sensor.

The communication component 1916 is configured to facilitate communication, wired or wirelessly, between the UE 1900 and other devices. The UE 1900 can access a wireless network based on a communication standard, such as WiFi, 2G, or 3G, or a combination thereof. In one exemplary embodiment, the communication component 1916 receives a broadcast signal or broadcast associated information from an external broadcast management system via a broadcast channel. In one exemplary embodiment, the communication component 2908 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the UE 1900 may be implemented with at least one application specific integrated circuit (ASIC), digital signal processor (DSP), digital signal processing device (DSPD), programmable logic device (PLD), field programmable gate arrays (FPGA), controller, micro-controller, microprocessor, or other electronic components, for performing the above described methods in any one of embodiments in FIG. 3 to FIG. 9 or FIG. 14.

In exemplary embodiments, there is also provided a non-transitory computer-readable storage medium including instructions, such as the memory 1904 including instructions executable by the processor 1920 in the UE 1900, for performing the above-described methods in any one of embodiments in FIG. 3 to FIG. 9 or FIG. 14. For example, the non-transitory computer-readable storage medium may be a ROM, a Random Access Memory (RAM), a CD-ROM, a magnetic tape, a floppy disc, an optical data storage device, and the like.

Figure 20:
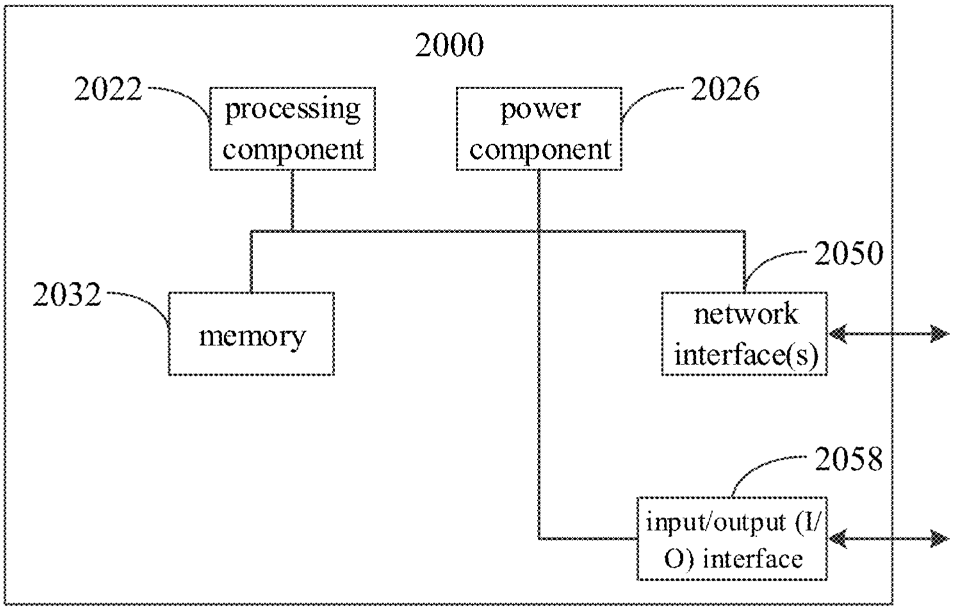
FIG. 20 is a schematic structural diagram of a network side device provided by an embodiment of the present disclosure.

FIG. 20 is a schematic structural diagram of a network side device provided by an embodiment of the present disclosure. Referring to FIG. 20, the network side device 2000 includes a processing component 2022 that further includes at least one processor, and memory resources represented by a memory 2032 for storing instructions executable by the processing component 2022, such as application programs. The application programs stored in the memory 2032 may include one or more modules each corresponding to a set of instructions. Further, the processing component 2022 is configured to execute the instructions to perform the above described methods which are applied at the network side device, for example, the methods in any one of the embodiments in FIG. 10 or FIG. 11 to FIG. 13.

The network side device 2000 may also include a power component 2026 configured to perform power management of the network side device 2000, wired or wireless network interface(s) 2050 configured to connect the network side device 2000 to a network, and an input/output (I/O) interface 2058. The network side device 2000 may operate based on an operating system stored in the memory 2032, such as Windows Server™, Mac OS X™, Unix™, Linux™, FreeBSD™, or the like.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

In order to implement the above embodiments, embodiments of the present disclosure also provide a communication device. The communication device may be a network side device, or may be a UE, or may be a chip, chip system or processor and so on that supports the network side device to implement the above methods, or may be a chip, chip system or processor and so on that supports the terminal device to implement the above methods. The device may be used to implement the methods described in any of the above method embodiments. For details, please refer to the descriptions in the above method embodiments.

The communication device may include one or more processors. The processor may be a general-purpose processor or a special-purpose processor, etc. For example, it can be a baseband processor or a central processor. The baseband processor may be used to process communication protocols and communication data, and the central processor may be used to control the communication device (such as base station, baseband chip, UE or terminal device, terminal device chip, DU or CU, etc.), execute a computer program, and processes data for a computer program.

Optionally, the communication device may further include one or more memories, on which a computer program may be stored, and the processor executes the computer program, so that the communication device performs the methods described in the above method embodiments. Optionally, data may also be stored in the memory. The communication device and the memory may be provided separately or integrated together.

Optionally, the communication device may further include a transceiver and an antenna. The transceiver may be called a transceiving unit, a transceiving device, or a transceiving circuit, etc., and is used to realize transmission and receiving functions. The transceiver may include a receiver and a transmitter. The receiver may be called a receiving device or a receiving circuit, etc., and is used to realize the receiving function; the transmitter may be called a transmitting device or a transmitting circuit, etc., and is used to realize the transmitting function.

Optionally, the communication device may further include one or more interface circuits. The interface circuits are used to receive code instructions and transmit them to the processor. The processor executes the code instructions to cause the communication device to perform the methods described in any of the above method embodiments.

In one implementation, a transceiver for implementing receiving and transmitting functions may be included in the processor. For example, the transceiver may be a transceiving circuit, or an interface, or an interface circuit. The transceiving circuit, interface or interface circuit used to implement the receiving and transmitting functions may be separate or integrated together. The above-mentioned transceiving circuit, interface or interface circuit may be used for reading and writing of codes/data, or the above-mentioned transceiving circuit, interface or interface circuit may be used for signal transmission or delivery.

In one implementation, the processor may store a computer program, and the computer program runs on the processor, causing the communication device to perform the methods described in any of the above method embodiments. The computer program may be solidified in the processor, in which case the processor may be implemented in hardware.

In one implementation, the communication device may include a circuit, and the circuit may implement the functions of sending or receiving or communicating in the foregoing method embodiments. The processor and transceiver described in the present disclosure may be implemented in Integrated Circuit (IC), analog IC, Radio Frequency Integrated Circuit (RFIC), mixed signal IC, Application Specific Integrated Circuit (ASIC), Printed Circuit Board (PCB), electronic device, and so on. The processor and transceiver may also be manufactured using various IC process technologies, such as Complementary Metal Oxide Semiconductor (CMOS), nMetal-Oxide-Semiconductor (NMOS), Positive Channel Metal Oxide Semiconductor (PMOS), Bipolar Junction Transistor (BJT), bipolar CMOS (BiCMOS), silicon germanium (SiGe), gallium arsenide (GaAs), etc.

The communication device described in the above embodiments may be a network side device or a UE, but the scope of the communication device described in the present disclosure is not limited thereto. The communication device may be a stand-alone device or may be part of a larger device. For example, the communication device may be:

(1) an independent integrated circuit (IC), or a chip, or a chip system or subsystem;

(2) a collection of one or more ICs; optionally, the IC collection may further include a storage component for storing data and computer programs;
(3) ASIC, such as modem;
(4) a module that can be embedded in other device(s);
(5) a receiver, a terminal device, an intelligent terminal device, a cellular phone, a wireless device, a handheld device, a mobile unit, a vehicle-mounted device, a network side device, a cloud device, an artificial intelligence device, etc.;
(6) others, etc.

In a case where the communication device may be a chip or a chip system, the chip may include at least one processor and at least one interface. The number of processor(s) may be one or more, and the number of interface(s) may be more than one.

Optionally, the chip further includes a memory, which is used to store necessary computer programs and data.

Those skilled in the art can also understand that the various illustrative logical blocks and steps listed in the embodiments of the present disclosure may be implemented by electronic hardware, computer software, or a combination of both. Whether such functionality is implemented in hardware or software depends on the specific application and overall system design requirements. Those skilled in the art can use various methods to implement the described functions for each specific application, but such implementation should not be understood as beyond the scope of protection of the embodiments of the present disclosure.

The present disclosure also provides a readable storage medium on which instructions are stored, and when the instructions are executed by a computer, the functions of any of the above method embodiments are implemented.

The present disclosure also provides a computer program product, which, when executed by a computer, implements the functions of any of the above method embodiments.

The above embodiments may be implemented in whole or in part by software, hardware, firmware, or any combination thereof. When implemented in software, the embodiments may be implemented in whole or in part in the form of a computer program product. The computer program product includes one or more computer programs. When the computer program is loaded and executed on a computer, processes or functions described in accordance with the embodiments of the present disclosure are generated in whole or in part. The computer may be a general-purpose computer, a special-purpose computer, a computer network, or other programmable device. The computer program may be stored in a computer-readable storage medium, or may be transferred from one computer-readable storage medium to another, for example, the computer program may be transferred from a website, computer, server, or data center to another website, computer, server or data center through wired (such as coaxial cable, optical fiber, DSL (Digital Subscriber Line)) or wireless (such as infrared, wireless, microwave, etc.) means. The computer-readable storage medium may be any available medium that can be accessed by a computer or a data storage device such as a server, data center, etc. that contains one or more available media integrated. The available medium may be magnetic medium (for example, floppy disk, hard disk, magnetic tape), optical medium (for example, high-density DVD (Digital Video Disc)), or semiconductor medium (for example, SSD (Solid State Disk)), etc.

Those of ordinary skill in the art can understand that first, second, and other numerical numbers involved in the present disclosure are only for convenience of description and are not used to limit the scope of the embodiments of the disclosure, nor to indicate a sequential order. The term "at least one" in the present disclosure can also be described as one or more, and the plurality can be two, three, four or more, and the present disclosure is not limited thereto. In the embodiments of the present disclosure, for a kind of technical features, "first", "second", "third", "A", "B", "C" and "D", etc. are used to distinguish technical features in the kind of technical features, and technical features described associated with "first", "second", "third", "A", "B", "C" and "D" are in no particular sequential order or order of size.

The corresponding relationships shown in each table in the present disclosure can be configured or predefined. Value(s) of information in each table is (are) only examples and can be configured as other values, which is not limited by the present disclosure. When configuring a corresponding relationship between information and each parameter, it is not necessarily required to configure all the corresponding relationships shown in each table. For example, in a table in the present disclosure, a corresponding relationship shown in some rows may not be configured. For another example, appropriate modified adjustments can be made based on the above table, such as splitting, merging, etc. Names of parameters shown in titles of the tables may also be other names understandable by a communication device, and values or expressions of parameters may also be other values or expressions understandable by the communication device. When implementing the tables, other data structures can also be used, such as arrays, queues, containers, stacks, linear lists, pointers, linked lists, trees, graphs, structure bodies, classes, heaps, hash tables or lists, and so on.

Predefinition in the present disclosure may be understood as definition, definition in advance, storage, pre-storage, pre-negotiation, pre-configuration, solidification, or pre-burning.

Those of ordinary skill in the art will appreciate that the units and algorithm steps of each example described in conjunction with the embodiments disclosed herein can be implemented with electronic hardware, or a combination of computer software and electronic hardware. Whether these functions are performed in hardware or software depends on the specific application and design constraints of the technical solutions. Skilled artisans may implement the described functions using different methods for each specific application, but such implementations should not be considered to be beyond the scope of the present disclosure.

Those skilled in the art can clearly understand that for the convenience and simplicity of description, the specific working processes of the systems, devices and units described above can be referred to the corresponding processes in the foregoing method embodiments, and will not be described again here.

The above are only example embodiments of the present disclosure, but the protection scope of the present disclosure is not limited thereto. Any person familiar with the technical field can easily think of changes or substitutions within the technical scope disclosed in the present disclosure, and such changes or substitutions fall within the protection scope of the present disclosure. Therefore, the protection scope of the present disclosure should be determined by the appended claims.

What is claimed is:

1. A method for determining a slot resource for a blind repetition, wherein the method is performed by User Equipment (UE) and the method comprises:

determining uplink grant information for the blind repetition, wherein the uplink grant information for the blind repetition is configured to schedule repetition of uplink information;

obtaining slot formats corresponding respectively to a plurality of slot resources, wherein the slot formats comprise at least one of an uplink slot, a downlink slot or a flexible/special slot;

selecting at least one available slot resource from the uplink slot and the flexible/special slot among the plurality of slot resources according to the uplink grant information for the blind repetition and the slot formats; and determining an actual available slot resource from the at least one available slot resource to perform the blind repetition of the uplink information.

2. The method according to claim 1, wherein selecting the at least one available slot resource from the uplink slot and the flexible/special slot among the plurality of slot resources according to the uplink grant information for the blind repetition and the slot formats comprises:

obtaining a number K of blind repetitions and a slot offset value k2 corresponding to the uplink grant information for the blind repetition; and based on the number K of blind repetitions and the slot offset value k2, determining, among slots after a slot n+k2−1, K slot resources with slot formats which are the uplink slot and the flexible/special slot as an available slot resource, where n is a position of a slot in which the uplink grant information for the blind repetition is received.

3. The method according to claim 1, wherein the slot formats are configured by cell common signaling.

4. The method according to claim 1, wherein:

in response to determining that, on a flexible slot resource, a symbol resource determined according to the uplink grant information for the blind repetition comprises a downlink symbol, the flexible slot resource is not determined as an available slot resource; or in response to determining that, on the flexible slot resource, the symbol resource determined according to the uplink grant information for the blind repetition does not comprise the downlink symbol, the flexible slot resource is determined as the available slot resource.

5. The method according to claim 1, wherein in response to that a symbol on a flexible slot resource is allocated for transmitting a Synchronization Signal Block (SSB) and the symbol is located within a symbol resource allocated for the uplink information, the flexible slot resource is not determined as an available slot resource; otherwise, the flexible slot resource is determined as the available slot resource.

6. The method according to claim 1, wherein determining the actual available slot resource from the at least one available slot resource to perform the blind repetition of the uplink information comprises:

in response to determining that dynamic indication information or user-specific configuration signaling configures a flexible slot in the at least one available slot as a downlink slot, determining the flexible slot as an actual unavailable slot resource; otherwise, determining the flexible slot as the actual available slot resource.

7. The method according to claim 1, further comprising:

receiving indication information sent from a network side device, wherein the indication information is configured to indicate a maximum common set for a plurality of UEs in a cell where the UE resides in or a maximum common set for a plurality of UEs in a same beam direction, wherein the maximum common set comprises a plurality of slot resources corresponding to the uplink slot and the flexible/special slot.

8. The method according to claim 7, wherein the selecting at least one available slot resource from the uplink slot and the flexible/special slot among the plurality of slot resources according to the uplink grant information for the blind repetition and the slot formats comprises:

determining a slot resource in the maximum common set as the at least one available slot resource.

9. The method according to claim 8, wherein determining the actual available slot resource from the at least one available slot resource to perform the blind repetition of the uplink information comprises:

determining the number of slot resources required for repetitions;

determining a repetition starting slot resource for the uplink information; and according to the repetition starting slot resource, performing selection of the actual available slot resource from the maximum common set, until the number of slot resources required for repetitions is reached.

10. The method according to claim 1, further comprising:

performing a repetition of the uplink information on the actual available slot resource.

11. The method according to claim 1, wherein the uplink information is a message 3 (Msg3).

12. A communication device comprising: a transceiver; a memory; and a processor respectively connected to the transceiver and the memory, wherein the processor is configured to control transmission and reception of a radio signal by the transceiver by executing computer-executable instructions on the memory, and implement the method according to claim 1.

13. A non-transitory computer storage medium, wherein the computer storage medium stores computer-executable instructions, wherein the computer-executable instructions are executed by a processor to implement the method according to claim 1.

14. A method for determining a slot resource for a blind repetition, wherein the method is performed by a network side device and the method comprises:

determining downlink grant information for the blind repetition, wherein the downlink grant information for the blind repetition is configured to schedule repetition of downlink information;

determining slot formats corresponding respectively to a plurality of slot resources, wherein the slot formats comprise at least one of an uplink slot, a downlink slot or a flexible/special slot;

selecting at least one available slot resource from the downlink slot and the flexible/special slot among the plurality of slot resources according to the downlink grant information for the blind repetition and the slot formats;

determining an actual available slot resource from the at least one available slot resource; and performing the blind repetition of the downlink information to User Equipment (UE) using the actual available slot resource.

15. The method according to claim 14, wherein the downlink information comprises at least one of a message 2 (Msg2), a message 4 (Msg4) or a paging message.

* * * * *